United States Patent [19]
de La Chapelle et al.

[11] Patent Number: 5,422,477
[45] Date of Patent: Jun. 6, 1995

[54] HIGH ACCURACY OPTICAL ROTATION SENSING SYSTEM

[75] Inventors: Michael de La Chapelle; Edward J. Vertatschitsch, both of Bellevue; Gregory L. Abbas, Fall City; Charles R. Porter, Redmond, all of Wash.

[73] Assignee: The Boeing Company, Seattle, Wash.

[21] Appl. No.: 130,509

[22] Filed: Oct. 1, 1993

Related U.S. Application Data

[63] Continuation-in-part of Ser. No. 752,109, Aug. 28, 1991, Pat. No. 5,294,075.

[51] Int. Cl.6 ............................................. H01J 5/16
[52] U.S. Cl. ............................ 250/227.12; 250/227.21
[58] Field of Search ...................... 250/227.12, 227.21; 375/45, 47

[56] References Cited

U.S. PATENT DOCUMENTS 5,030,824 7/1991 Babbitt .......................... 250/227.21

Primary Examiner—David C. Nelms
Attorney, Agent, or Firm—Mark L. Fleshner

[57] ABSTRACT

An optical sensing system with a rotation sensor head for sensing the rotation of a rotatable object while simultaneously sensing the position of a displaceable object with a position sensor head. An electro-optical unit outputs a modulated optical signal and a chirped rf signal. The envelope of the modulated optical signal has a phase that has a known relation to the phase of the chirped rf signal. The electro-optical unit is coupled to a light guide element and receives and transmits the modulated optical signal along an optical path for reflection off a disk secured to the rotatable object in order to provide a rotation sensing optical signal. A transducing unit receives the rf signal at one input and has another input optically coupled to receive the rotation sensing optical signal while simultaneously receiving position sensing optical signals from the position sensor heads. The transducing unit produces a multi-frequency electrical signal which includes first and second frequencies, the first frequency corresponding to the rotation sensor location and the difference between the first and second frequencies corresponding to the rotation rate of the rotatable object. A rotation detecting unit coupled to the output of the transducing unit processes the multi-frequency signal in order to determine the difference frequency corresponding to the rotation rate of the rotatable object.

29 Claims, 26 Drawing Sheets

Sine wave chopper wheel

HIGH ACCURACY OPTICAL ROTATION SENSING SYSTEM

CROSS REFERENCE TO RELATED APPLICATION

This application is a continuation-in-part application of U.S. patent application Ser. No. 07/752,109, filed Aug. 28, 1991, now U.S. Pat. No. 5,294,075 the disclosure of which is incorporated herein by reference.

BACKGROUND OF THE INVENTION

1. Field of the Invention

This invention relates generally to an apparatus and method for sensing physical phenomena and particularly to an optical sensing system and its associated rotation sensor head for sensing rotation of one or more rotatable objects. Still more particularly, the invention relates to a high accuracy optical radar, fiber optic rotation sensing system and its associated rotation sensor head for use on an aircraft in order to measure rotations of various moving parts of the aircraft at high rates and with short lag times and simultaneously processing optical signals from position sensor heads.

2. Background of the Related Art

Traditionally, electrical sensors are used to measure the rates of rotation of rods connected to rotors and position of various actuators in an aircraft. Results of these measurements are then fed back to a system flight controller which processes this information and outputs appropriate commands to control the rotors and actuators.

Rotor rotation rates can vary from a few hundred revolutions per minute (rpm) to a few tens of thousands of rpm depending on the rotor. A sensor head associated with a rod connected to the rotor sends a rotation signal representing the rate of rotation of the rod to a processor that calculates a rotation rate. Rotation measurements of the rod must be fed to the flight controllers at rates up to several hundred Hz, with a lag time less than a few milliseconds, and with accuracies of 0.1 to 1%. Here, lag time is defined to be the time between completion of raw data collection from a sensor and transmission of a position measurement to the flight controller.

While this is taking place, position measurements are also being made. A typical position actuator has a rod secured within an outer casing. Depending on the actuator, the rod can move back and forth a maximum distance of a few millimeters to over 50 cm. This maximum distance is often referred to as a stroke. A sensor head associated with the actuator sends a position signal representing the position of the actuator rod to the processor which in turn calculates a position measurement. Position measurements of the rod must be fed to the flight controller at rates up to several hundred Hz, with a lag time less than a few milliseconds to 0.5 ms, and accuracies of a fraction of a percent.

Fiber optic sensing systems offer numerous advantages over conventional electrical sensing systems. First, they are small and lightweight. In addition, they can be made immune from electromagnetic interference (EMI) which can occur near power lines, and electromagnetic pulses (EMP) which can occur in the event of a nuclear explosion. EMI/EMP immunity is an especially important advantage for new generation aircraft which have skins made largely of composite (non-metallic, non-shielding) material. Without heavy, bulky and expensive shielding of conventional electrical sensors and control lines, these next generation aircraft cannot be safely flown in areas of severe EMI/EMP. Therefore, "fly-by-light" systems or fiber optic sensing systems have the potential to replace "fly-by-wire" systems in future aircraft to measure rotation rates of various rotation rods in the aircraft.

Chopper wheel systems are one approach to measuring rotation rates of rods in an aircraft. Chopper wheel systems involve shining light through a chopper wheel and detecting the transmitted light at a photodetector. As the chopper wheel rotates, it chops the light before it reaches the photodetector causing a square wave signal to be output by the photodetector. This square wave signal output by the photodetector is then input to an amplifier and then applied to a zero crossing detector which counts the number of chops in a given period of time. Such a chopper wheel system, however, does not allow multiplexing of multiple rotation heads, because a separate photodetector is required for each sensor. Moreover, such a system does not support position sensor heads.

On the other hand, fiber optic (position) sensor systems do not have the capability to receive and process optical signals from both rotation sensor heads and position sensor heads. It is desirable that a single sensor system be used to measure rotation as well as position of the various actuators on an aircraft.

Some fiber optic position sensing systems use digital or optical encoding techniques in order to vary the amplitude of an incident optical signal as a surface is moved. However, sensor heads for these types of sensor systems cannot be easily multiplexed with each other and consequently cost, complexity, weight and volume of the system are increased. Furthermore such systems cannot simultaneously operate both rotation sensor heads and position sensor heads.

Another type of fiber optic position sensor system sometimes called an optical time domain reflectometer (OTDR) uses a pulsed optical source. In particular, OTDRs measure distances to in-line fiber reflectors by estimating the round trip transit time of a light pulse from the pulsed optical source to the in-line fiber reflector and back to a detector. Both the measurement accuracy and estimation times are fundamentally limited by the amplitude and width of the light pulse. Also, such a sensor system cannot be modified to measure rotation rates. In fact, it is even difficult to multiplex multiple position sensor heads in OTDR systems.

Another type of fiber optic position sensor system is a coherent optical frequency domain reflectometer (COFDR). COFDRs use coherent frequency modulated (FM) optical radiation. However, the rotation rates of rotating objects on aircraft are much smaller than the line width of optical sources used in the COFDR and consequently cannot be easily measured, and optical sources with narrow line widths tend to have low output power and low reliability. Also, Doppler shifts due to linear motion of associated actuators cause large shifts in intermediate frequency estimations which translates into large errors in position measurements. Moreover, all fibers used in COFDRs must be single mode polarization preserving fibers in order to coherently optically mix returned FM optical signals with an optical local oscillator signal and consequently are difficult to install and maintain.

SUMMARY OF THE INVENTION

An object of the invention is therefore to provide an optical sensing system capable of simultaneously obtaining high accuracy rotation measurements from a plurality of rotation sensor heads.

Another object of the invention is to provide a sensing system capable of multiplexing a plurality of different types of rotation and position sensor heads.

Another object of the invention is to provide an optical sensing system to be used on an aircraft with a controller which controls flight of the aircraft.

Another object of the invention is to provide an optical sensing system with passive sensor heads and easy to shield active electronics, thereby making the sensing system relatively immune to EMI and EMP.

Another object of the invention is to provide a small and lightweight optical sensing system.

Another object of the invention is to provide an inexpensive and reliable optical sensing system.

An advantage of the invention is that it can obtain rotation measurements which are substantially independent of external temperature changes and vibrations.

Another advantage of the invention is that errors due to non-linearities in a ramped RF source signal are canceled out. A feature of the invention is that it uses passive sensor heads.

Another feature of the invention is that a ramped RF source is used to intensity modulate a light source.

Another feature of the invention is that it can use multimode optical fibers.

Another feature of the invention is that rotation and position measurements are updated using a tracker.

Another feature of the invention is that a single optical fiber can be used at the sensor head to transmit and receive an optical signal.

The above and other objects advantages and features are accomplished in accordance with the invention by the provision of a rotation sensor head for modulating a chirped optical signal in accordance with rotation of a rotatable object, including: a first optical signal directing unit for directing the chirped optical signal in a first direction; a disk positioned in the first direction and coupled to the rotatable object so that it rotates in accordance with the rotation of the rotatable object, the disk having at least one section and intercepting the chirped optical signal in accordance with the rotation of the rotatable object thereby outputting a modulated chirped optical signal; and an optical transmitting unit optically coupled to the disk for transmitting the chirped optical signal away from the disk.

In accordance with another aspect of the invention, the disk has alternating reflective wedges and non-reflective wedges.

In accordance with still another aspect of the invention, the disk has sections whose reflectivity varies sinusoidally.

The above and other objects, advantages and features are accomplished in accordance with the invention by the provision of an optical sensing system for sensing rotation of a rotatable element, including an electro-optical unit for outputting a modulated optical signal and a chirped rf signal, the envelope of the modulated optical signal having a phase that has a known relation to the phase of the chirped rf signal; a light guide unit coupled to the electro-optical unit for receiving and transmitting the modulated optical signal along an optical path for reflection off a surface of the rotatable element to provide a rotation sensing optical signal; a transducing unit having an output and two inputs, one of the two inputs electrically coupled to the electro-optical unit for receiving the chirped rf signal and the other of the two inputs optically coupled to the light guide unit for receiving the position sensing optical signal having a first time delay with respect to the chirped rf signal, the transducing unit producing at its output a multi-frequency electrical signal which includes a first frequency corresponding to the first time delay and side band frequencies corresponding to the rotation of the rotatable object; and a rotation detecting unit coupled to the output of the transducing unit for processing the multi-frequency signal for determining a difference frequency corresponding to the difference between the first and second frequencies and representing the rotation of the rotatable element.

The above and other objects, advantages and features are accomplished in accordance with the invention by the provision of a method for determining the rotation rate of a rotatable element. The method includes producing a chirped rf signal and producing a modulated optical signal having an envelope of modulation with a phase that is known with respect to the phase of the chirped rf signal. The method further includes transmitting the modulated optical signal along an optical path and reflecting the modulated optical signal off a surface of the rotatable element to provide a rotation sensing optical signal. The method also includes producing an electrical signal as a function of the rotation sensing optical signal, mixing the chirped rf signal and the electrical signal to produce a multi-frequency signal with first and second frequencies corresponding to the first and second time delays, respectively, and detecting a difference frequency of the multi-frequency signal corresponding to the difference between the first and second frequencies, the difference frequency representing the rate of rotation of the rotatable element.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
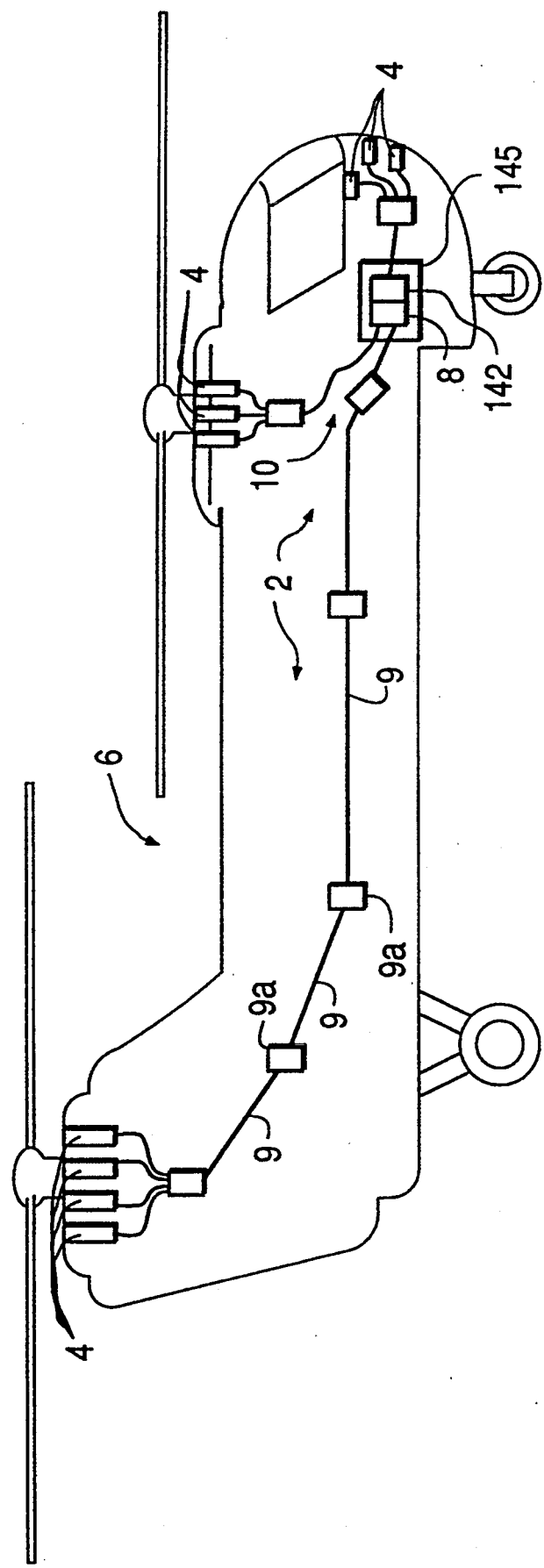
FIG. 1 is a schematic showing an application of an optical sensing system in a helicopter.

In order to realize a small, lightweight fiber optic sensor system which has EMI/EMP immunity, it is desirable to use passive sensor heads in which all electrical connections at the sensor heads are eliminated. FIG. 1 shows an optical sensing system 2 with passive sensor heads 4 in a helicopter 6 with a flight controller 8. Optical signals are coupled between sensor heads 4 and flight controller 8 by a light guide system, which in the disclosed embodiment comprises optical fibers 9 and optical connectors 9a connecting together different sections of optical fibers. As can be seen, if N passive sensor heads 4 are used, all electrical connections for fiber optic sensor system 2 and controller 8 can be maintained in a centralized, easy to shield location 10. Passive sensor heads 4 can be position sensor heads or rotation sensor heads. Passive sensor heads serving as position sensor heads will be described first. Then, passive sensor heads serving as rotation sensor heads will be described in conjunction with FIGS. 16–19.

Figure 2:
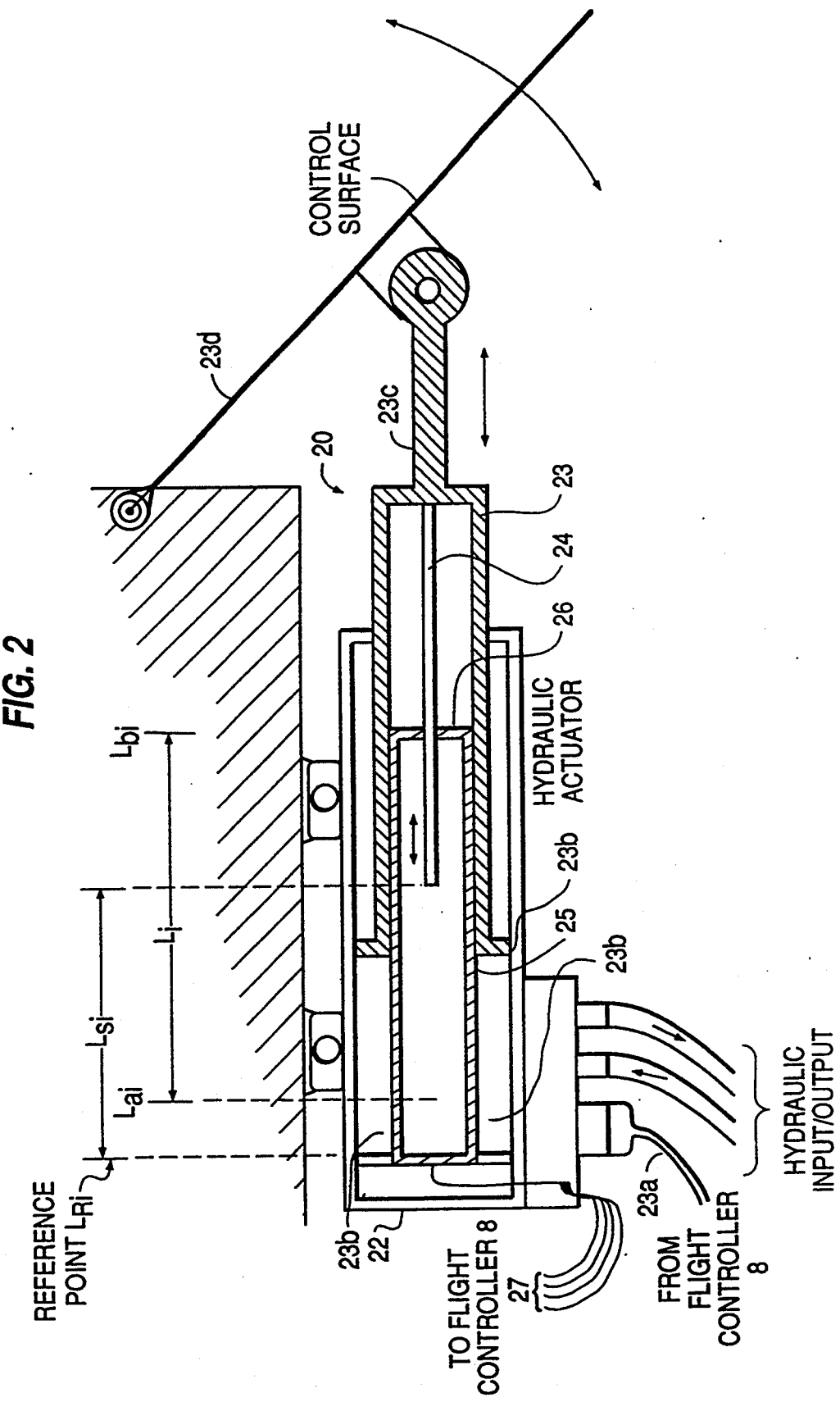
FIG. 2 shows a partially broken away side view of a typical linear actuator which can be used with the optical position sensing system.

FIG. 2 shows an example of an actuator 20 (Boeing 767 outboard spoiler) associated with one of the passive sensor heads 4 schematically shown in FIG. 1. Actuator 20 has an outer casing 22 within which a metal tube 23 moves in response to control signals from flight controller 8 input on wires 23a which control hydraulic valves (not shown) causing hydraulic pressure in cavity 23b to increase or decrease thereby causing metal tube 23 to slide back and forth within outer casing 22. Metal tube 23 is connected to an outer rod 23c which is attached at its right-hand end to an object 23d such as a control surface to be controlled by the flight controller. Rod 24 is secured to metal tube 23 and moves within a sensor casing 25 guided by a sealing ring 26. Rod 24 can move between points Lai and Lbi a total stroke length $L_i = Lai - Lbi$, and at any point in time rod 24 is at a position $L_{Si}$ with respect to a reference point $L_{Ri}$. An electrical sensor head for actuator 20 has several coils of wire (not shown) wrapped around sensor tube 25 which output signals corresponding to the position of rod 24 to flight controller 8 via wires 27. A typical electrical sensor is GM6850E linear transducer by Kavlico Corporation. Stroke $L_i$ can vary from several millimeters to over 50 centimeters. In addition, the position $L_{Si}$ of rod 24 must be updated and sent to flight controller 8 at rates $R_i$ of several hundred Hz and with lag times $T_{Li}$ under 0.5 ms. Again, lag time $T_{Li}$ is defined to be the time from which data is sensed from $i^{th}$ passive sensor head 4 to the time the position measurement $L_{Si}$ is calculated and transmitted to flight controller 8. Finally, position measurements must be made with an accuracy of $\delta L_{Si}$ of a few hundred micrometers and preferably less than 100 micrometers. In addition, controller 8 must simultaneously receive position information from all passive sensor heads 4. Sensor head 4 can be completely embedded inside actuator 20. Depending on the object (control surface) to which actuator 20 is attached, controller 8 may require position information at rates of several hundred Hz in order to complete a feedback loop thereby maintaining operation of the aircraft. Controller 8 can be a computer or microcomputer and completes flight control loops in a known manner.

Figure 3:
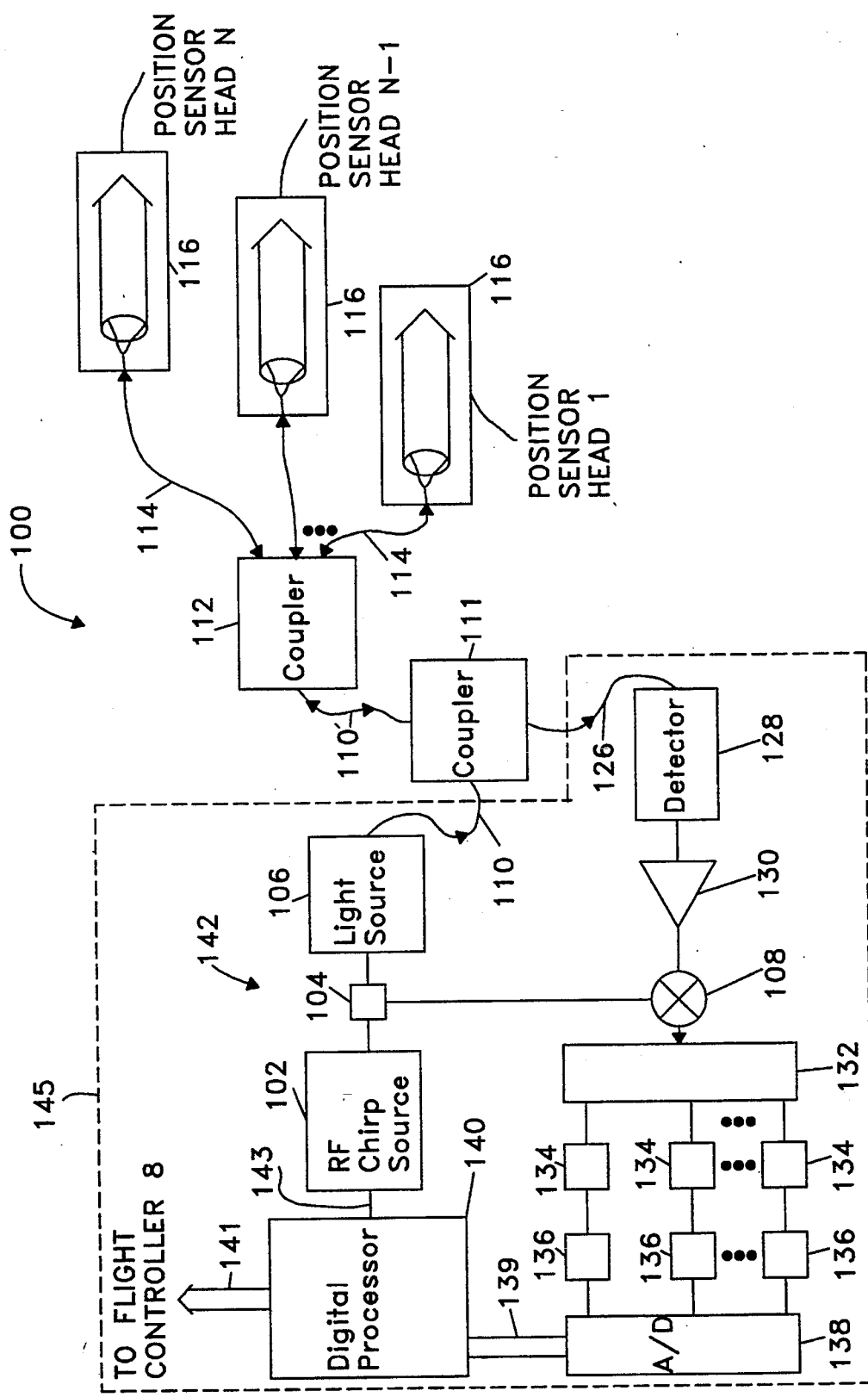
FIG. 3 is a block circuit diagram of the optical sensing system according to one embodiment of the invention.

An embodiment of an optical sensing system 100 according to the invention is shown in FIG. 3. An RF chirp source 102 produces an RF signal with a linearly varying frequency over a chirp duration T. This RF signal is sometimes referred to as a "chirped" RF signal. The chirped RF signal is split into two chirped RF signals using an RF splitter or power divider 104. One of the two chirped RF signals is used to drive (intensity modulate) a light source 106 and the other is used as an RF local oscillator signal which is input to an RF mixer 108. Light source 106 outputs an intensity modulated (IM) optical signal with an envelope which is chirped in phase with the chirped RF signal. The chirped IM optical signal is guided down a first transmitting optical fiber 110 to an optical coupler 111 and then to an optical coupler 112 via transmitting/receiving fiber 110' where it is divided, in a known manner, into N chirped IM optical signals, where N is a positive integer. These N chirped IM optical signals are input to N second transmitting optical fibers 114 each of which transmits one of the N chirped IM optical signals to one of N sensor heads corresponding to sensor heads 4 in FIG. 1. These N sensor heads can be position sensor heads 116 or rotation sensor heads 116', the latter to be discussed in conjunction with FIGS. 16–19. Consequently, optical sensing system 100 will first be discussed for the case in which all N sensor heads are position sensing heads 116.

RF chirp source 102 can be an electrically controlled rf source such as a YIG tuned oscillator for example a Ferretec FS02106. RF chirp source 102 can also be a processor with a digital-to-analog converter that creates digital signals representing RF chirps and then digital-to-analog converts the chirps. Light source 106 could be a laser diode such as Lasertron QLM1300MW, a solid state laser, or even a light emitting diode (LED). First transmitting fiber 110 and N second transmitting fibers 114 can be multi-mode or single mode fibers. An example of RF splitter 104 is Picosecond Labs 5330. An example of optical coupler 111 is Australian Optical Fiber AOFR AS50-09-R-C-ST which is a 2×2 asymmetric coupler. If light source 106 is a pigtailed diode laser with fiber 110 being a single mode fiber and pigtailed to light source 106 then coupler 111 can be a multimode coupler and yet optical coupling loses remain low ($\approx 3$ dB) since the single mode pigtail excites only lower order modes in transmitting/receiving fiber 110' and multimode transmitting fibers 114 when light approaches sensor heads 116.

Figure 4:
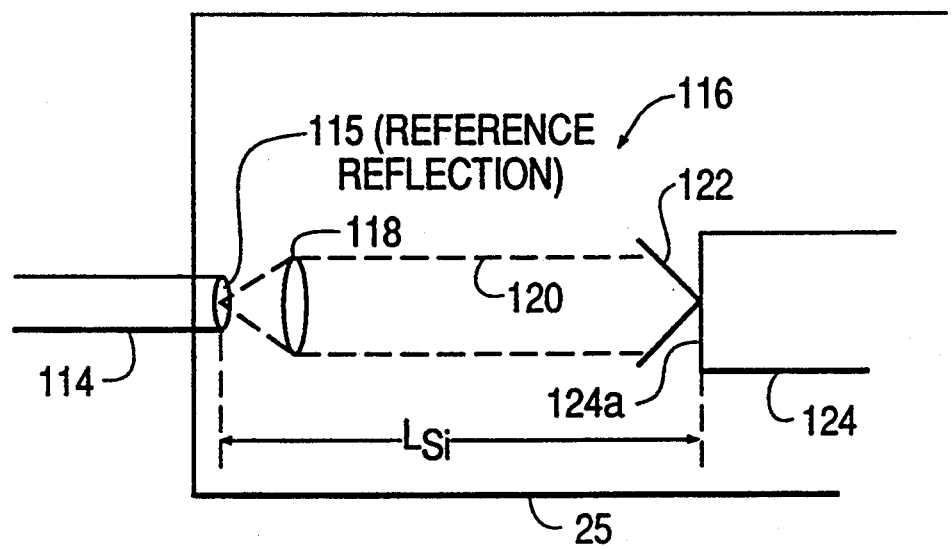
FIG. 4 shows an enlarged view of position sensor heads 116 shown in FIG. 3.

FIG. 4 shows a closeup view of one of the position sensor heads 116 corresponding to sensor heads 4 in FIG. 1. Position sensor head 116 is embedded in sensor tube 25. One of the N chirped IM optical signals is output by a second transmitting fiber 114 to a lens 118 which collimates the chirped IM optical signal into a collimated beam 120. Collimated beam 120 travels to a corner cube 122 which acts as a retroreflector reflecting the collimated beam 120 back through lens 118 and into second transmitting fiber 114. Corner cube 122 is secured to an end face 124a of a rod 124 which corresponds, for example, to rod 24 in actuator 20 shown in FIG. 2. Any type of reflecting surface can be used in lieu of corner cube 122 as long as it scatters sufficient optical energy back to second transmitting fiber 114. For example, the end of rod 124 can be coated with a commercially available retroreflective material or the end surface of rod 124 may already be sufficiently reflective to serve the intended purpose.

After scattering off corner cube 122, beam 120 passes back through lens 118 as a chirped IM optical target signal (sometimes referred to herein as a position sensing optical signal) and into second transmitting fiber 114 which guides the chirped IM optical target signal back to optical coupler 112. This occurs for each of N position sensor heads 116 corresponding to N second transmitting fibers 114. Returning to FIG. 3, the N chirped IM optical target signals are then redirected by optical coupler 112 to transmitting/receiving fiber 110' to coupler 111 then to a receiving fiber 126 which guides the N chirped IM optical target signals to a photodiode receiver (or detector) 128. Photodiode receiver 128 detects the N chirped IM optical target signals and outputs corresponding N delayed chirped RF target signals. Receiving fiber 126 can also be a single or multimode fiber. An example of photodiode receiver 128 is Antel ARD-28.

First transmitting fiber 110, transmitting/receiving fiber 110' second transmitting fiber 114 and receiving fiber 126 introduce a time delay $\delta T_{Ri}$ for the $i^{th}$ chirped IM optical signal. The ith sensor head 116 delays the $i^{th}$ chirped IM optical signal by an additional amount, $\delta t_i$ corresponding to the time that beam 120 travels a distance $\delta L_{Si}$. That is, beam 120 travels from tip 115 of second transmitting fiber 114 through lens 118 to corner cube 122 back through lens 118 and to tip 115 in time $\delta t_i$. Therefore, the total delay $\delta T_{Ti}$ for the $i^{th}$ chirped IM optical signal is $$\delta T_{Ti} = \delta T_{Ri} + \delta T_i. \qquad \text{Eq. (1)}$$

Photodiode receiver 128 outputs N delayed chirped RF target signals starting at N different times corresponding to N delays $\delta T_{T1}, \ldots, \delta T_{TN}$. These N delayed chirped RF target signals are amplified by a linear amplifier 130 which outputs N amplified RF target signals to RF mixer 108. RF mixer 108 mixes the N amplified RF target signals with the RF local oscillator signal from RF splitter 104. An example of linear amplifier 130 is Miteq AFS4-00101000-30-10P-4, and an example of RF mixer 108 is Avantek TFX18075L.

Figure 5A:
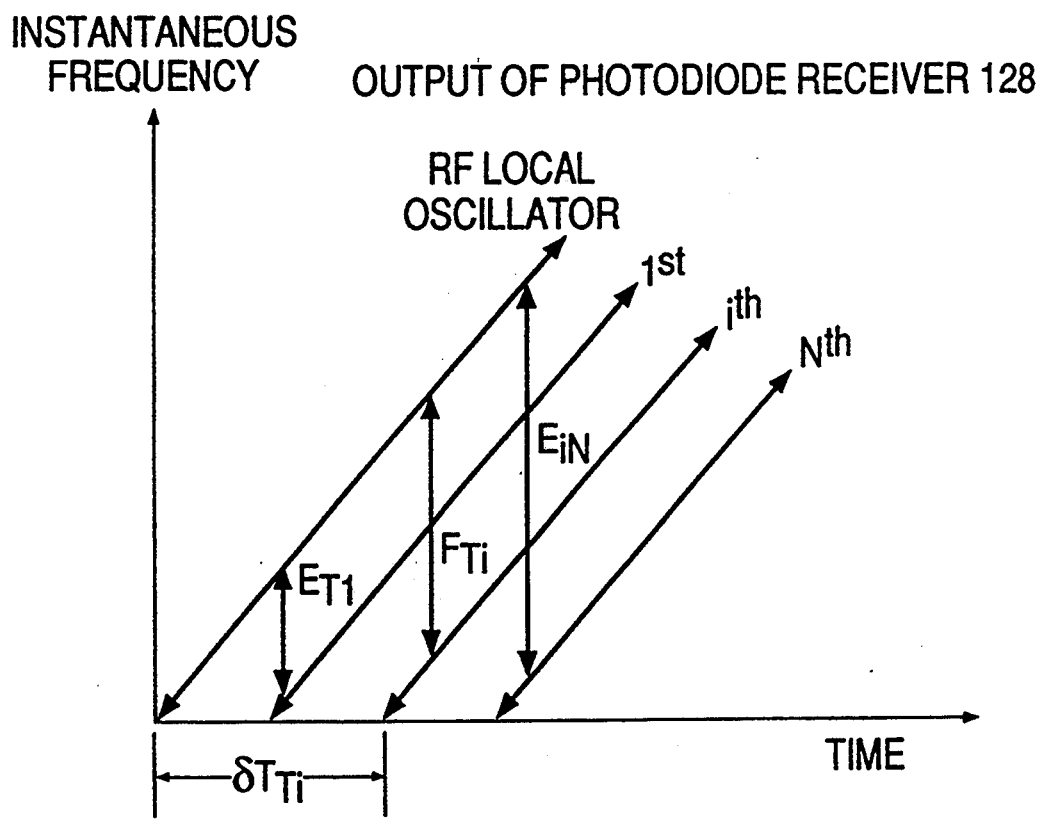
FIGS. 5a–5c show graphical representations of an RF mixing process at mixer 108 in FIG. 3.
Figure 5B:
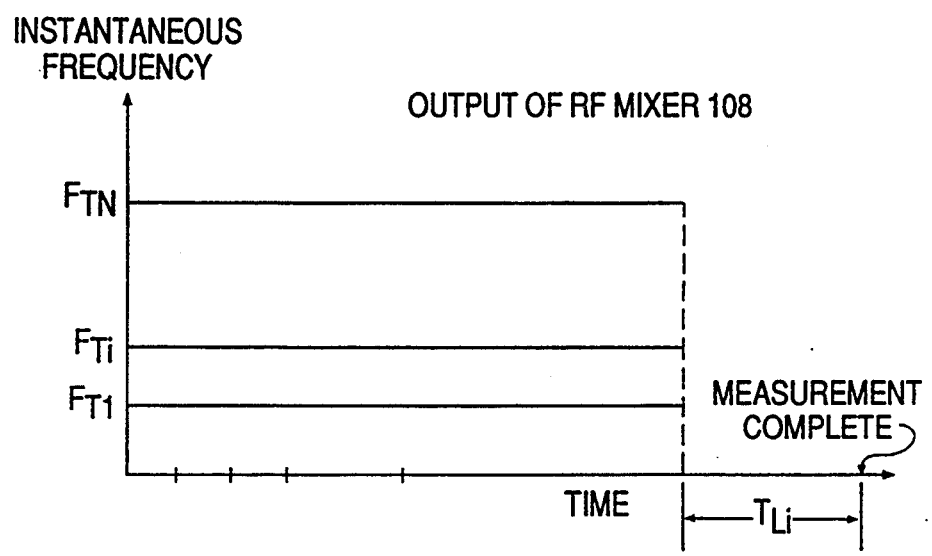
Figure 5C:
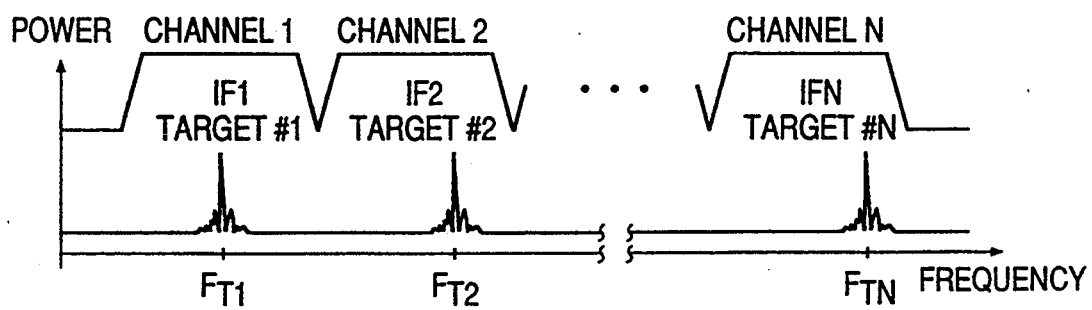

FIGS. 5a–5c show graphical representations of the RF mixing process. FIG. 5a is a graphical representation (not to scale) in frequency versus time of the RF chirped local oscillator signal and the $1^{st}, \ldots,$ ith, $\ldots,$ $N^{th}$ delayed chirped RF target signals at the inputs of RF mixer 108. The $1^{st}, \ldots,$ ith, $\ldots,$ $N^{th}$ delayed chirped RF target signals have delays $\delta T_{T1}, \ldots, \delta T_{Ti}, \ldots, \delta T_{TN}$, respectively.

FIG. 5b is a graph in frequency versus time of the N intermediate frequency (IF) target signals output by RF mixer 108. In particular, mixing the RF local oscillator signal with the N delayed chirped RF target signals results in N intermediate frequency (IF) target signals with peak frequencies $F_{T1}, \ldots, F_{Ti}, \ldots, F_{TN}$, corresponding to delays $\delta T_{T1}, \ldots, \delta T_{Ti}, \ldots, \delta T_{TN}$, respectively.

FIG. 5c shows a Fourier transformation of the N intermediate frequency target signals when delays $\delta T_{T1}, \ldots, \delta T_{TN}$ are adequately spaced apart; namely, when the lengths of N second transmitting fibers 114 are chosen such that the peak frequencies $F_{T1}, F_{T2}, \ldots, F_{TN}$ are sufficiently spread apart to be filtered later.

Returning to FIG. 3, an N channel filter or demultiplexing filter 132 filters and passes the N IF target signals to non-linear devices 134 which square the respective N IF target signals and output N squared IF target signals to respective audio low pass filters 136. Non-linear devices 134 are advantageous if, not only IF target, but also IF reference signals are used as will be discussed below. It will be further shown that non-linear devices 134 are advantageous when the sensor heads are rotation sensor heads 116'. At this point, however, non-linear devices 134 and low pass filters 136 can be bypassed and the N IF target signals can be input directly to analog-to-digital (A/D) converter 138. Analog-to-digital (A/D) converter 138 synchronously samples and digitally multiplexes the N IF target signals output by audio low pass filters 136. A digital processor 140 then receives the digitized signals from A/D converter 138 and calculates and sends position information to flight controller 8 via a bus 141. Digital processor 140 synchronizes data gathering with the generation of RF chirp ramping by RF chirp source 102 by sending RF chirp source 102 clock information via line 143. Digital processor 140 can also digitally create chirps and digital-to-analog convert these digital chirps to an analog chirped RF signal for modulating light source 106. An example of digital processor 140 is an IBM AT compatible microcomputer with a Mercury MC-32-AT-IO-6 vector processing board.

The active electronics as described above may be packaged as a unit 142 and placed in an electro-magnetic shield 145 (FIGS. 1 and 3) and thus confined to a single location on helicopter 6. Electro-magnetic shield 145 can be made of metal and could shield controller 8 as well.

The delays $\delta T_{T1}, \ldots, \delta T_{Ti}, \ldots, \delta T_{TN}$ vary due to temperature changes of first transmitting fiber 110, transmitting/receiving fiber 110', the N second transmitting fibers 114 and receiving fiber 126. This can lead to significant errors in the position measurement of rod 124. For example, temperature sensitivity of the index of refraction for glass is approximately $10^{-5}/°$ C. so that a shift in temperature of 150° C. can lead to a 4.5 cm range measurement error for a 30 meter long fiber. In addition, vibrations in first transmitting fiber 110, optical coupler 112, N second transmitting fibers 114 or receiving fiber 126 can cause a shift in the peak frequencies $F_{T1}, \ldots, F_{TN}$. Therefore, the position of corner cube 122 and consequently of rod 124 in each position sensor head 116 cannot be determined with high accuracy by solely measuring the peak frequencies $F_{T1}, F_{T2}, \ldots, F_{TN}$ of the N intermediate frequency target signals.

The effects due to temperature variations and mechanical vibrations and cable length tolerances are eliminated by producing and processing N chirped IM optical "reference" signals along with the N chirped IM optical target signals as discussed below. These N chirped IM optical reference signals experience nearly identical delays from temperature fluctuations and fiber vibrations as the N chirped IM optical target signals. The N chirped IM optical reference signals are detected by photodiode receiver 128 which outputs N corresponding chirped RF reference signals which are also mixed with mixer 108 to produce N IF reference signals. The effects due to temperature variations and mechanical vibrations on rotation rate measurements using rotation sensor heads 116' can be eliminated without such a reference reflection because rotation sensor heads 116' produce side bands which serve the role of such a reference signal as will be discussed in accordance with FIGS. 16-19.

The N chirped IM optical reference signals are produced, for example, from radiation scattered back off tips 115 (FIG. 4) of N second transmitting fibers 114 due to a fibercore/air interface at tips 115. They can also be produced using connectors or fusion spliced in-line references which are relatively close (e.g. <1 m) to tips 115 of N second transmitting fibers 114. Hence, the N chirped IM optical signals are scattered back through N second transmitting fibers 114, optical coupler 112 and return fiber 126, and are detected by photodiode receiver 128. The amplitudes of the N chirped IM optical reference signals can be varied depending on how tips 115 are cleaved. For example, if tips 115 are cleaved at an angle with respect to a 90° transverse cross section of the N second transmitting fibers 114, then the amplitudes of the N chirped IM optical signals can be reduced. Also, if tips 115 are coated with a dielectric such as titanium dioxide (TiO2), the amplitudes of the N chirped IM optical reference signals can be increased. It is desirable to have N target and N reference signals with approximately the same amplitudes.

As will now be shown, effects due to vibrations and variations in temperature of fibers 110, 110', 114 and 126 can be minimized or eliminated and the delay $\delta_{ti}$ can be obtained for each of the N sensor heads 116 by measuring and appropriately processing the target and reference peak frequencies $F_{R1}, F_{T1}, \ldots, F_{RN}, F_{TN}$. The $i^{th}$ total fiber length $L_{Fi}$ is related to the $i^{th}$ IF reference frequency $F_{Ri}$ as follows:

$$F_{Ri} = 2B/T \, (L_{Fi}/v_f);\qquad\text{Eq. (2a)}$$

and the $i^{th}$ total fiber length $L_{Fi}$ and the $i^{th}$ target distance $L_{Si}$ are related to the $i^{th}$ target frequency $F_{Ti}$ as follows:

$$F_{Ti} = 2B/T \, (L_{Fi}/v_f + L_{Si}/c);\qquad\text{Eq. (2b)}$$

where,
i=1, 2, ... N

B = chirp bandwidth,
T = chirp duration,
$v_f$ = fiber propagation velocity,
c = speed of light,
$L_{Fi}$ = length of total fiber to the $i^{th}$ sensor head 116.
$L_{Si}$ = distance between tip 115 and corner cube 122 for $i^{th}$ sensor head 116.

Difference frequencies $FD_i$ can then be obtained, where $$F_{Di} = F_{Ti} - F_{Ri}, \text{ and } i=1, 2, \ldots, N.$$

Using Equations (2a) and (2b), the difference frequency $F_{Di}$ for each of the i=1, ..., N position sensor heads 116 is, $$F_{Di} = (2B/T)(L_{Si}/c),\qquad\text{Eq. (3a)}$$

from which the target position $L_{Si}$ is, $$L_{Si} = F_{Di}(cT/2B).\qquad\text{Eq. (3b)}$$

Equation 3b can be used to determine the position $L_{Si}$ of rod 124 in each position sensor head 116. Hence, the position measurement of each rod 124 is independent of mechanical and thermal effects that change the fiber length or propagation velocity of optical radiation in any of the fibers in optical sensing system 100.

Figure 6A:
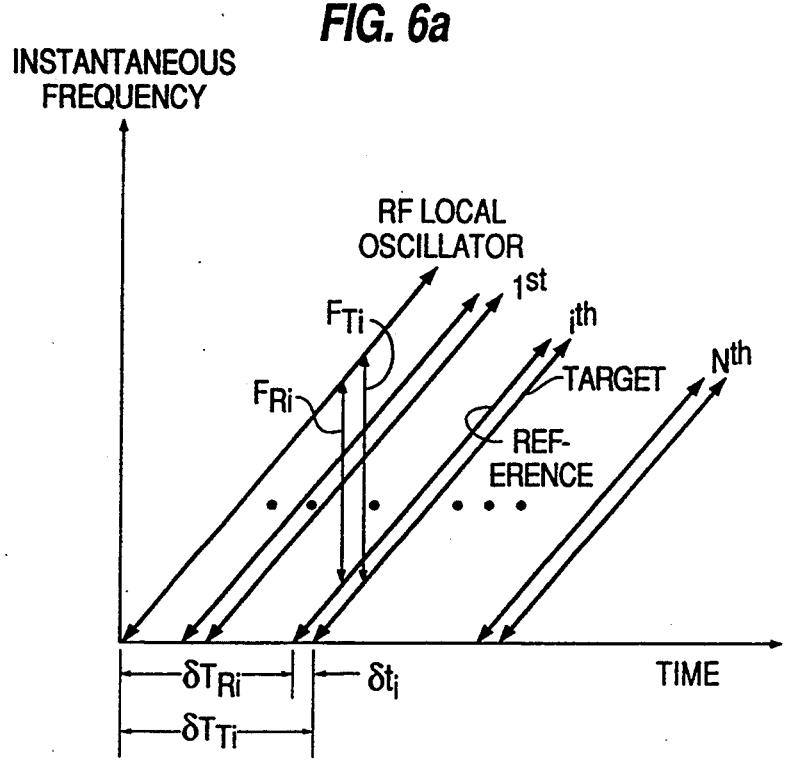
FIGS. 6a–6c correspond to FIGS. 5a–5c but with an additional N chirped optical reference signals.
Figure 6B:
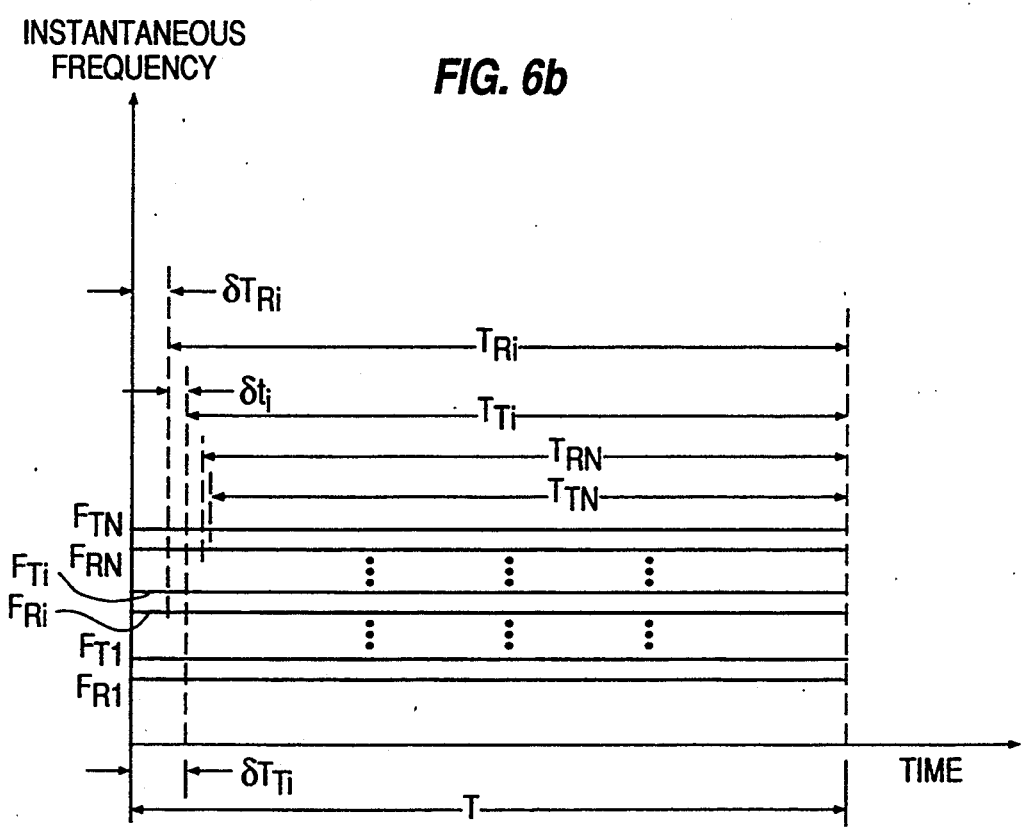
Figure 6C:
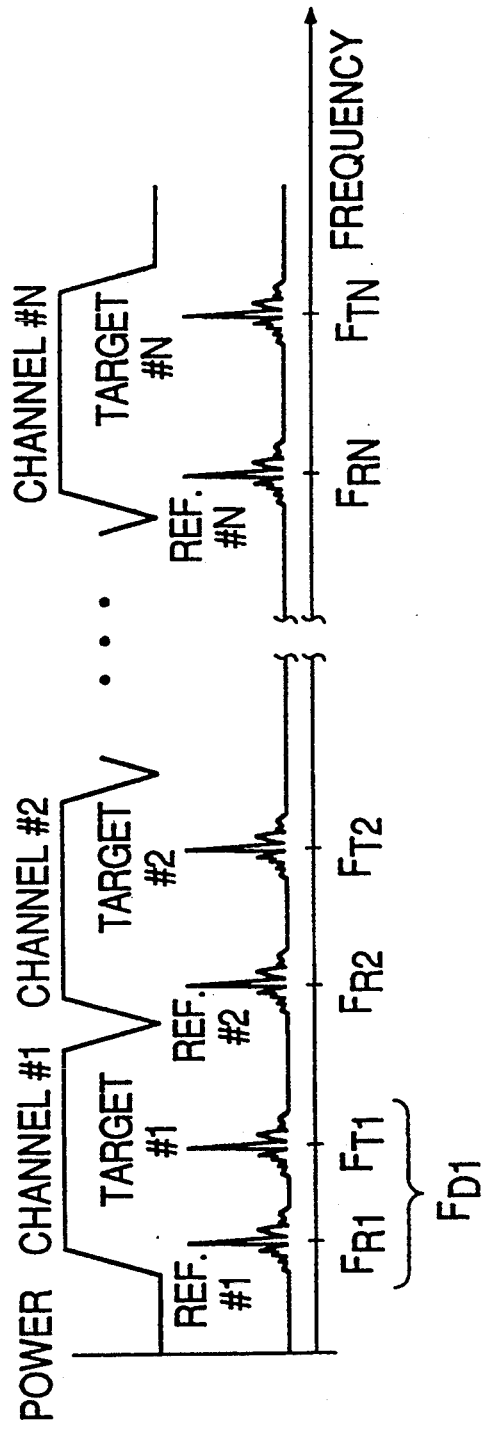

FIGS. 6a-6c correspond to FIGS. 5a-5c with the additional N chirped optical reference signals. FIG. 6a shows the RF local oscillator signal and the $1^{st}, \ldots$, ith, ..., $N^{th}$ delayed chirped RF target and reference signals at the input of RF mixer 108. The $1^{st}, \ldots$, ith, ..., $N^{th}$ delayed chirped RF target signals have delays $\delta T_{T1}, \ldots, \delta T_{Ti}, \ldots \delta T_{TN}$, respectively and the $1^{st}, \ldots$, ith, ..., $N^{th}$ delayed chirped RF reference signals have delayed $\delta T_{R1}, \ldots, \delta T_{Ri}, \ldots \delta T_{RN}$, respectively.

FIG. 6b is a graphical representation of the N IF target signals with peak frequencies $F_{T1}, \ldots, F_{Ti}, \ldots, F_{TN}$ and the N corresponding IF reference signals with peak frequencies $F_{R1}, \ldots, F_{Ri}, \ldots, F_{RN}$, respectively, and chirp duration T. The delay of the $i^{th}$ IF target signal is $\delta T_{Ti}$ and the delay of the $i^{th}$ reference signal is $\delta T_{Ri}$. Since the $i^{th}$ IM optical target signal traveled a longer distance than the corresponding $i^{th}$ IM optical reference signal for each position sensor head 116, the delay of the $i^{th}$ target signal $\delta T_{Ti}$ is greater than the delay of the $i^{th}$ reference signal $\delta T_{Ri}$. Consequently, the peak frequency $F_{Ti}$ of the $i^{th}$ IF target signal is greater than the peak frequency $F_{Ri}$ of the $i^{th}$ IF reference signal as shown in FIG. 6b.

FIG. 6b also shows that the $i^{th}$ IF target signal is available to be sampled by A/D converter 138 for a time $T_{Ti}$ and the $i^{th}$ IF reference signal is available to be sampled for a time $T_{Ri}$, where $$T_{Ti} = T - \delta T_{Ti}$$

$$T_{Ri} = T - \delta T_{Ri}\qquad\text{Eq. (4)}$$

Typically, sensor heads 116 are located 20 to 30 meters from active electronics unit 142 and therefore $\delta T_{Ti}$ and $\delta T_{Ri}$ are much smaller than T. Consequently the time that A/D converter 138 can sample the target signal and the reference signal is approximately the duration T of the chirp. The difference in delay between the delay of the target signal $\delta T_{Ti}$ and the delay of the reference signal $\delta T_{Ri}$ is $\delta t_i$, i.e., $$\delta t_i = \delta T_{Ti} - \delta T_{Ri}\qquad\text{Eq. (5)}$$

Since the $i^{th}$ IM optical target signal must travel a round trip distance which is twice the target position $L_{Si}$, the $i^{th}$ delay $\delta t_i$ is related to the $i^{th}$ target position $L_{Si}$ by $$L_{Si} = c\delta t_i / 2 \qquad \text{Eq. (6)}$$

FIG. 6c shows a frequency spectrum of the IF target and reference signals at the output of RF mixer 108 when the N chirped RF reference signals are mixed with the local oscillator signal. The peak frequencies $F_{R1}, F_{R2}, \ldots, F_{RN}$ corresponding to each of the N IF reference signals will vary with temperature and vibrations in a manner nearly identical to variations in peak frequencies $F_{T1}, F_{T2}, \ldots, F_{TN}$, respectively, of the IF target signals.

N channel filter 132 in FIG. 3 is made of N bandpass filters with output channels 1, ..., N coupled into non-linear devices 134. Non-linear devices 134 produce both sum terms $F_{Si} = F_{Ti} + F_{Ri}$ and difference terms $F_{Di} = F_{Ti} - F_{Ri}$. Similar types of difference terms will result when some of position sensors 116 are replaced by rotation sensors 116'. In particular, it will be shown (with reference to FIGS. 16-19) that rotation sensors 116 also output a difference frequency term $F_{Di}$ when non-linear devices 134 are employed.

Transfer characteristics of non-linear device 134 should be as close to "square law" as possible so as to minimize harmonics of the difference frequencies $F_{Di}$. Examples of non-linear devices 134 include crystal detectors, mixers, RF power detectors or zero-biased diodes, saturated amplifiers, logarithmic amplifiers, analog multipliers and limiters.

The outputs of non-linear devices 134 are input to audio low pass filters 136 in order to eliminate the sum terms $F_{Si}$. Analog-to-digital (A/D) converter 138 synchronously samples and digitally multiplexes analog signals output by audio low pass filters 136. Digital processor 140 receives the digitized difference signals from A/D converter 138 and determines the N difference frequencies $F_{D1}, \ldots, F_{DN}$ relative to which the positions $L_{Si}$ of rods 124 are directly proportional, independent of temperature variations and vibration as previously explained.

An alternative approach to obtaining $F_{Di}$ involves bypassing nonlinear devices 134 and directly determining peak frequencies $F_{Ri}$ and $F_{Ti}$ using digital processor 140. Once peak frequencies $F_{Ri}$ and $F_{Ti}$ are determined, difference frequency $F_{Di}$ could be calculated by subtracting $F_{Ri}$ from $F_{Ti}$ using digital processor 140, thereby canceling out errors due to temperature variations and mechanical vibrations as discussed above. In addition, this approach can cancel out errors caused by the non-repeatability in the slope (frequency versus time) of chirps. However, this approach can result in a performance penalty due to non-linearities in frequency versus time of any one chirp output by chirp source 102 as will now be discussed.

A theoretically best performance achievable by a signal processor which estimates a peak frequency of a tone in additive white Gaussian noise is discussed in "High-Precision Fiber-Optic Position Sensing Using Diode Laser Radar Techniques" by G. L. Abbas et al., SPIE Vol. 1219, *Laser-Diode Technology and Applications II* (1990), incorporated herein by reference. There it is shown that estimation error $\delta L_{Ti}$ (which is defined here to be the accuracy of the estimation) and target signal-to-noise density ratio ($SNDRT_{TARi}$) at the output of photodiode receiver 128 for the $i^{th}$ IF target signal are given by $$\delta L_{Ti} = \frac{(3)^{1/2} c}{2\pi B (SNDR_{TARi} \cdot T)^{1/2}}, \qquad \text{Eq. (7a)}$$

and $$SNDR_{TARi} = \frac{\text{SIGNAL POWER}_{TARi}}{\text{SHOT NOISE} + \text{THERMAL NOISE} + \text{INTENSITY NOISE}}, \qquad \text{Eq. (7b)}$$

where SHOT NOISE and THERMAL NOISE are receiver parameters, INTENSITY NOISE is a laser parameter, B is the RF chirp bandwidth, T is the estimation time (chirp duration), and c is the speed of light. Similarly, the estimation error $\delta L_{Ri}$ and reference $SNDR_{REFi}$ for an optimal estimator is given by $$\delta L_{Ri} = \frac{(3)^{1/2} c}{2\pi B (SNDR_{REFi} \cdot T)^{1/2}}, \qquad \text{Eq. (8a)}$$

and $$SNDR_{REFi} = \frac{\text{SIGNAL POWER}_{REFi}}{\text{SHOT NOISE} + \text{THERMAL NOISE} + \text{INTENSITY NOISE}} \qquad \text{Eq. (8b)}$$

As can be seen from Equations 7a and 8a, increasing the chirp bandwidth B and the sampling time T decreases the estimation errors $\delta L_{Ti}$ and $\delta L_{Ri}$, respectively. Finally, assuming independence of target error $\delta L_{Ti}$ and reference error $\delta L_{Ri}$, differential range RMS error $\delta L_{Si}$ is, $$(\delta L_{Si})^2 = (\delta L_{Ti})^2 + (\delta L_{Ri})^2. \qquad \text{Eq. (9)}$$

Referring to FIG. 1, controller 8 of helicopter 6 typically requires data from sensor heads 4 (or 116 in FIG. 3) to be output at rates exceeding several hundred Hz and lag times under about 0.5 ms. Therefore, the chirp duration T should not exceed about 1 ms. In addition, actuators such as actuator 20 of FIG. 2, can have stroke lengths $L_i$ ranging from 0.5 cm to over 50 cm requiring an accuracy $\delta L_{Si}$ of less than 200 micrometers depending on the particular actuator. In order to achieve this accuracy, the chirp bandwidth B should be as large as possible. Referring to FIG. 4, if T=1 ms and B=6 GHz, each additional millimeter of separation between reference reflector (e.g., tip 115) and target reflector (e.g., corner cube 122) results in 40 Hz increase in difference frequency $F_{Di}$. Therefore, if tip 115 and corner cube 122 are separated by 50 cm, i.e., $L_{Si}$=50 cm, then $F_{Di}$ is 20 Khz. In this case, the peak frequency $F_{Ti}$ of the $i^{th}$ IF target and the peak frequency $F_{Ri}$ of the $i^{th}$ IF reference signal must be determined to within a few Hz in order to achieve accuracies of a few hundred micrometers. Non-linear devices 134 eliminate errors due to non-linearities of chirp source 102 as will be discussed below.

Figure 7A:
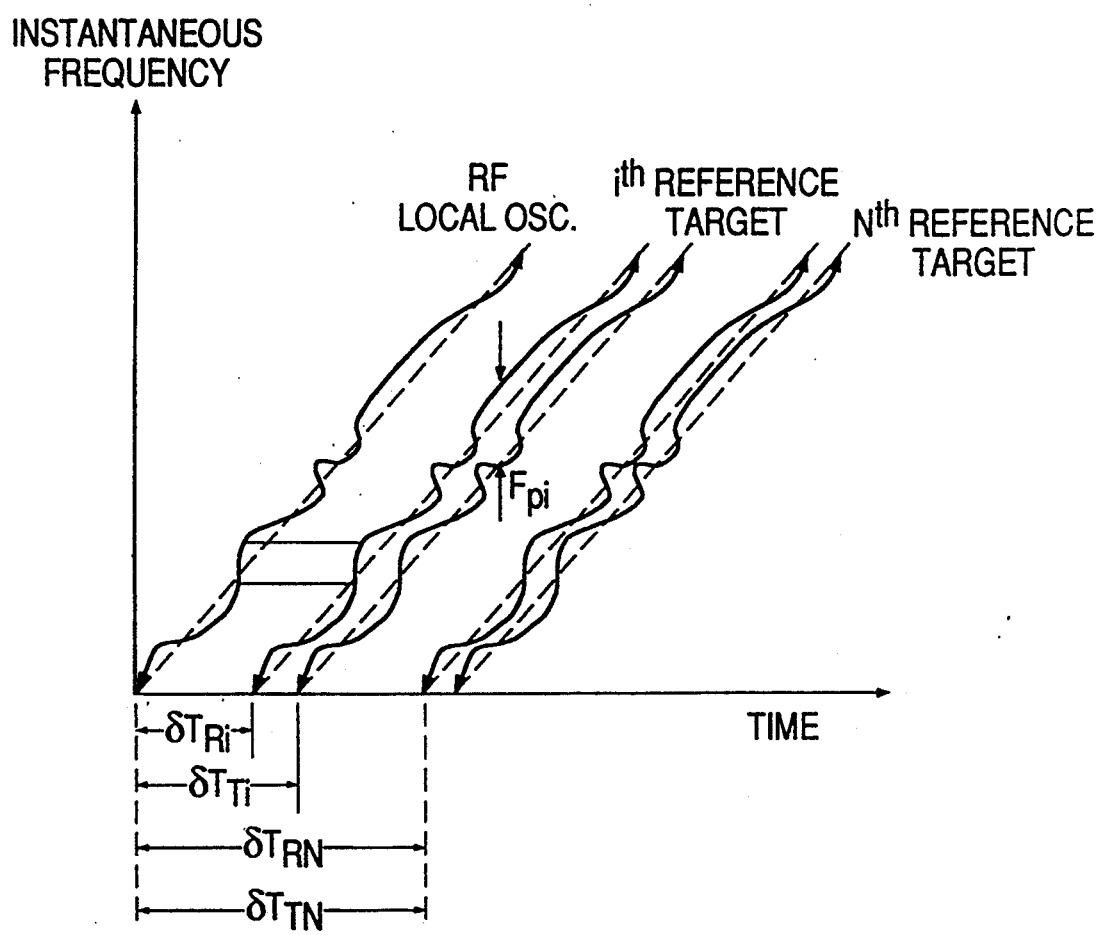
FIGS. 7a–7c correspond to FIGS. 6a–6c but with nonlinear RF chirps output from chirp source 102 of FIG. 3.
Figure 7B:
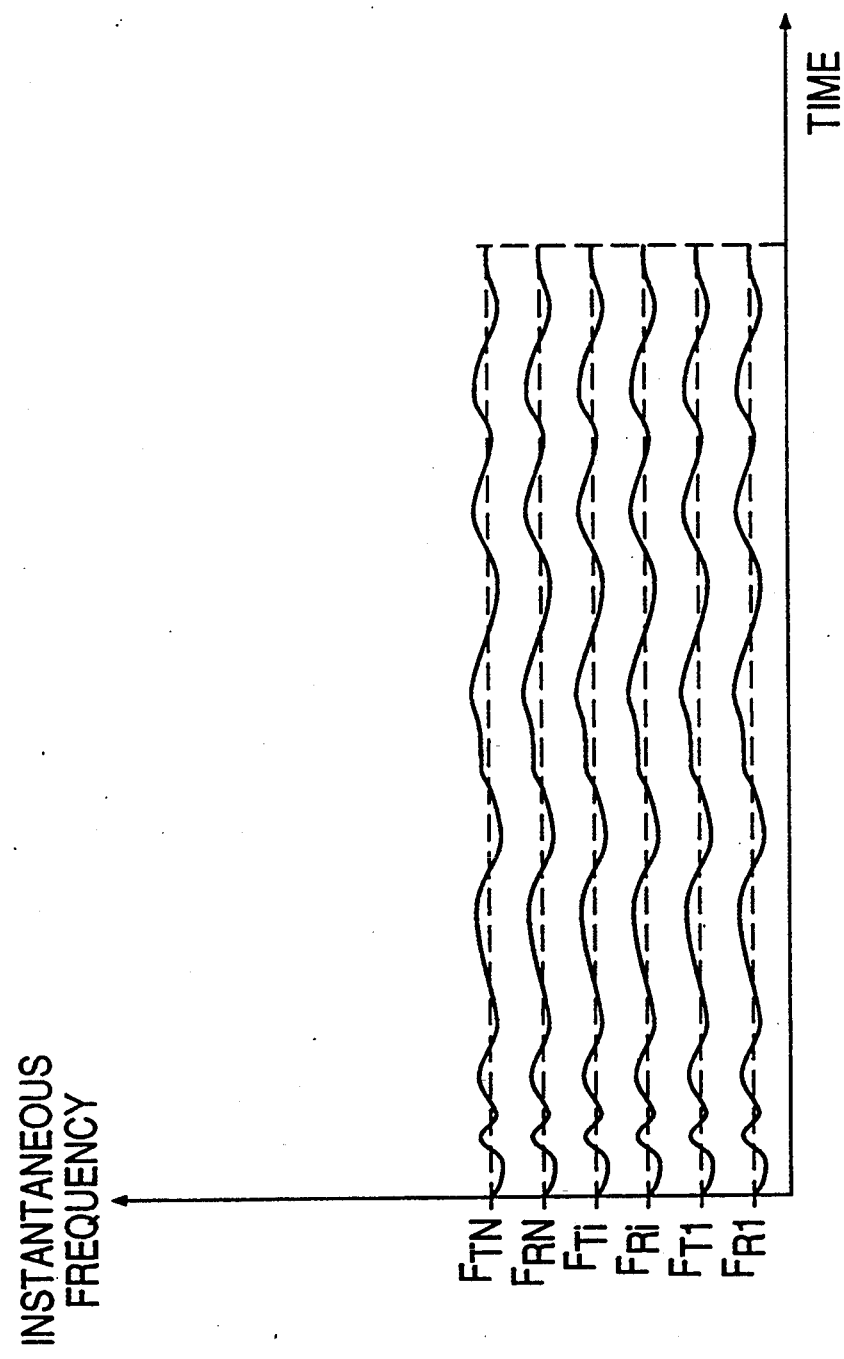
Figure 7C:
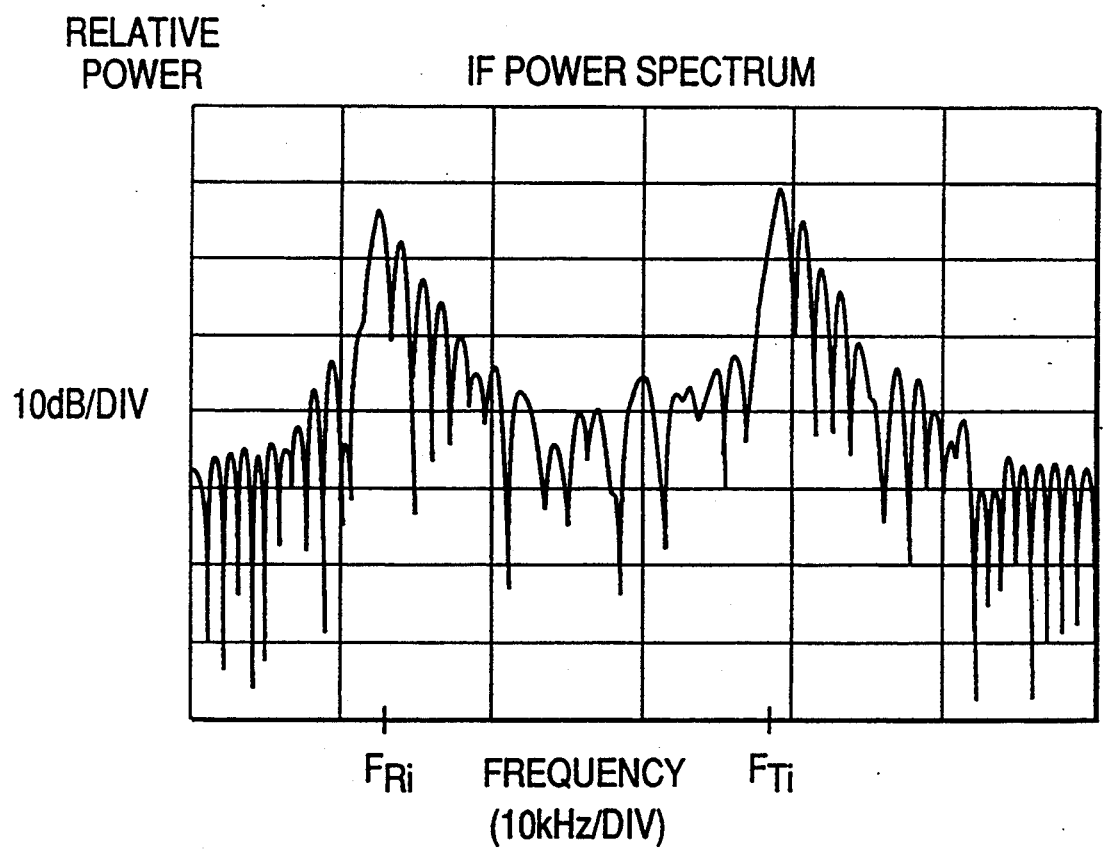

FIGS. 7a-7c correspond to FIGS. 6a-6c but with nonlinear frequency versus time variations which occur in RF chirp source 102. FIG. 7a shows the RF local oscillator signal and the $1^{st}, \ldots, i^{th}, \ldots,$ and $N^{th}$ delayed non-linear chirped target and reference signals at the input of RF mixer 108. The $1^{st}$, ..., ith, ..., $N^{th}$ delayed non-linear chirped RF target signals have delays $\delta T_{T1}, \ldots, \delta T_{Ti}, \ldots \delta T_{TN}$, respectively, and the $1^{st}$, ..., ith, ..., $N^{th}$ delayed nonlinearly chirped RF reference signals have delays $\delta T_{R1}, \ldots, \delta T_{Ri}, \ldots \delta T_{RN}$, respectively.

FIG. 7b corresponds to FIG. 6b taking into account nonlinearity of the chirped RF signal output by RF chirp source 102. If the total optical path length of the $i^{th}$ second transmitting fiber 114 added to the first transmitting fiber 110, transmitting/receiving fiber 110', and receiving fiber 126 is much larger than the corresponding stroke length $L_i$, then the condition $\delta t_i << \delta T_{Ti} \approx \delta T_{Ri}$ holds. In this case, non-linearities appearing at the output of mixer 108 nearly identically track each other as shown in FIG. 7b.

FIG. 7c shows a possible output of one of the channels in N channel filter 132. The distortions of the spectrum shown in FIG. 7c can be attributed to non-linear chirps produced by RF chirp source 102. Although the main lobes of the spectra corresponding to IF target and reference signals are identifiable, there is significant distortion around their peaks. These spectral distortions result in significant estimation errors of the peak frequencies $F_{Ri}$ and $F_{Ti}$. This distortion can be so great that the main lobes can be difficult to distinguish from the side lobes and it may be impossible to resolve the target signal from the reference signal.

Figure 8:
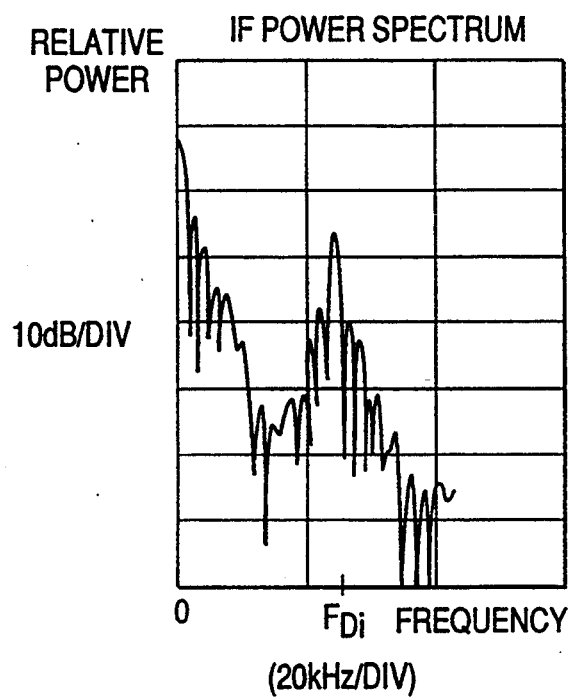
FIG. 8 shows a measured spectrum at a single channel output of audio low pass filters 136 of FIG. 3 after N IF target and N IF reference signals pass through non-linear devices 134.

FIG. 8 shows a measured spectrum for a single channel output of audio low pass filters 136 after the N IF target and N IF reference signals pass through non-linear devices 134. Here, the spectrum of the difference signal with peak frequency $F_{Di}$ and a DC signal is shown, with the spectrum corresponding to the difference signal being nearly symmetric about its peak frequency. The side lobes of the spectrum of the difference signal are about 12 dB down from the main lobe peak. As the ratio of delays $\delta t_i / \delta T_{Ri}$ increases, the advantage obtained by using non-linear devices 134 decreases, because non-linearities appearing in the reference signals and target signals will not track each other as well. However, as long as the condition $\delta t_i << \delta T_{Ri}$ is valid, RF chirp source 102 need not output extremely linear chirps and yet it is possible to obtain an extremely accurate estimation of peak frequency $F_{Di}$ using digital processor 140.

Figure 9A:
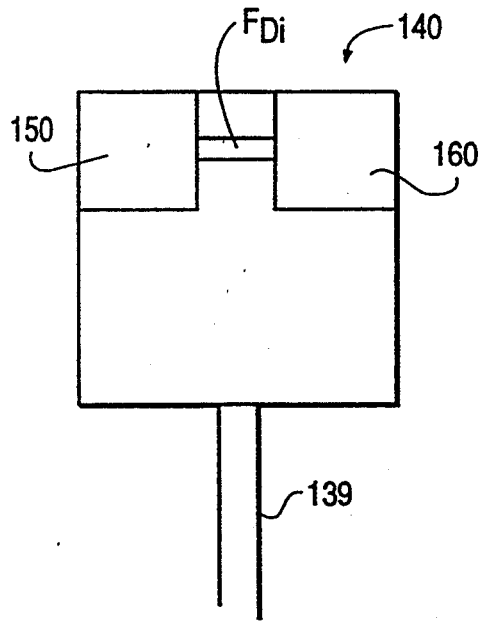
FIG. 9a is a block diagram representing the digital processor in FIG. 3.
Figure 9B:
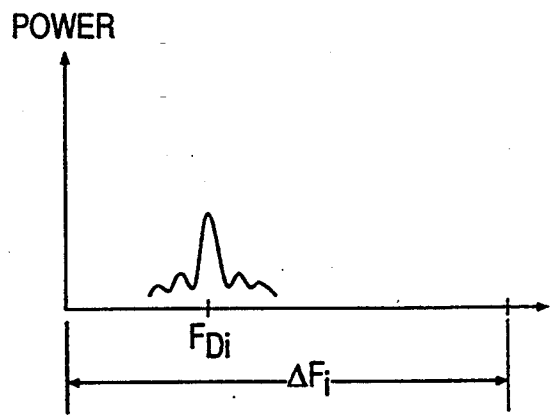
FIG. 9b shows a power versus frequency graphical representation of the bandwidth $D_{Fi}$ corresponding to full stroke length $L_i$ of the ith position sensor head.

The peak frequencies $F_{Di}$ of the difference signals appearing at the output of audio low pass filters 136 can be estimated with high accuracy using digital processor 140 as follows. FIG. 9a is a block diagram illustrating a functional representation of digital processor 140 which includes a searcher 150 and a tracker 160. FIG. 9b shows the bandwidth $\Delta F_i$ corresponding to a full stroke length $L_i$ for $i^{th}$ position sensor head 116. Once searcher 150 acquires a first peak frequency of the difference signal, searcher 150 outputs this information to tracker 160. Digital processor 140 is in a search mode until peak frequency $F_{Di}$ has been output to tracker 160 at which point processor 140 goes into a tracking mode. The peak frequency of the difference signal $F_{Di}$ is then tracked by tracker 160 and updated at high rates with short lag times.

Figure 10:
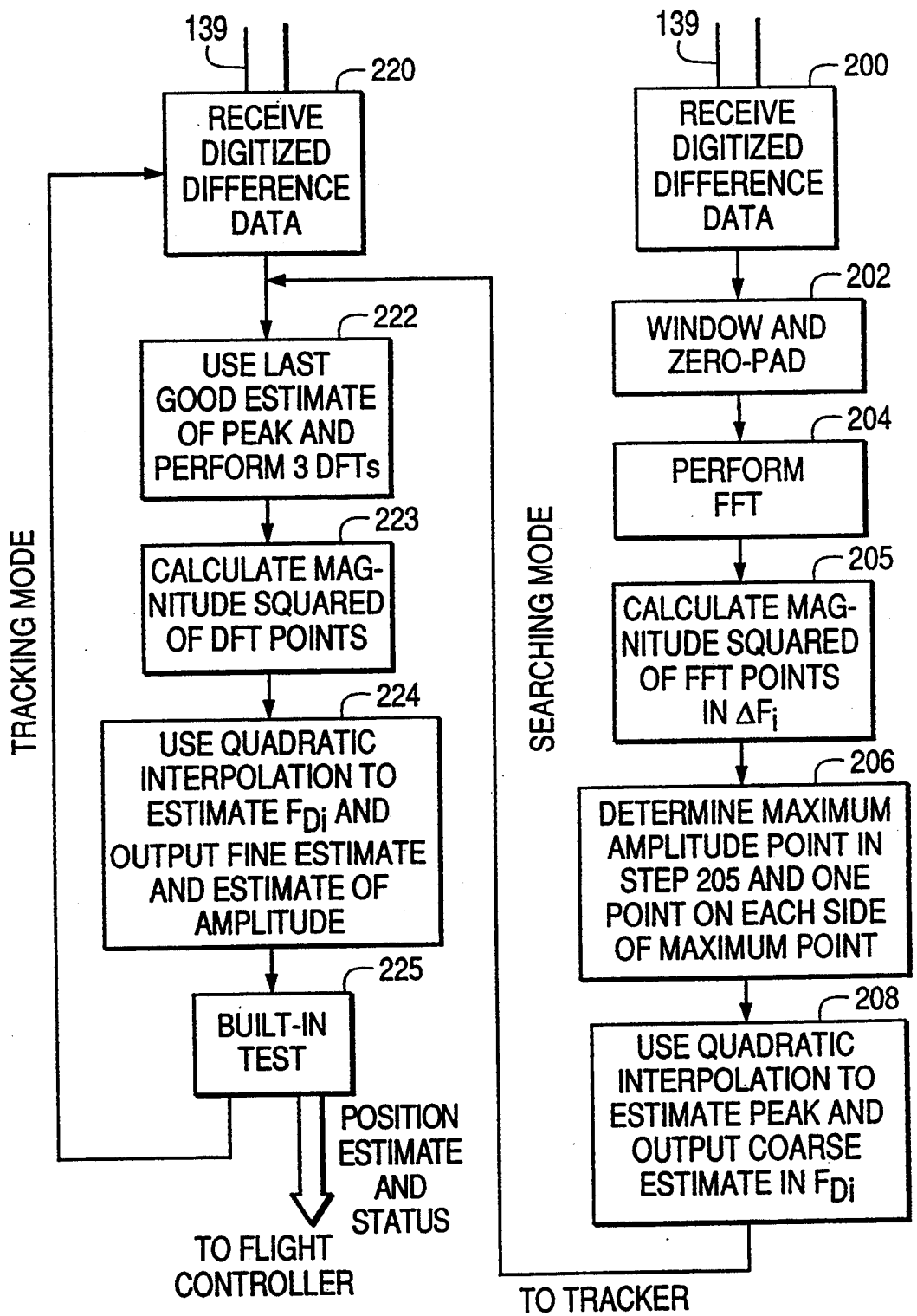
FIG. 10 is a flow diagram which shows processing steps for the search mode and the tracking mode of the digital processor in FIG. 9b.

FIG. 10 shows processing steps for the search mode and the tracking mode of processor 140 using digital processing techniques as are found in *Digital Signal Processing* by Oppenheim and Schafer, Prentice Hall, Inc., Englewood Cliffs, N.J. (1975), incorporated herein by reference. Searcher 150 is activated when processor 140 is in the search mode (steps 200–208) and tracker 160 is activated when processor 140 is in the track mode (steps 220–226). Searcher 150 operates as follows. At step 200, digital processor 140 receives the $i^{th}$ digitized difference data on databus 139 from A/D converter 138. Searcher 150 then windows and zero pads the $i^{th}$ digitized difference data at step 202 and a fast Fourier transform (FFT) is performed using the $i^{th}$ windowed zero-padded difference data at step 204 according to the processing techniques described in *Digital Signal Processing*, cited above. A Tukey window is used in order to suppress any interfering tones and to reduce bias as a consequence of the $i^{th}$ difference signal being available to be sampled only for a finite duration which is approximately the chirp duration T as discussed above. Tukey windows are also discussed in *Digital Signal Processing*. The FFT data is squared at step 205 and searcher 150 then selects the maximum of the squared FFT data and one point on each side of the maximum point at step 206. Searcher 150 then performs quadratic interpolation at step 208 using the 3 points from step 206 to provide a coarse estimate of the peak difference frequency $F_{Di}$.

Figure 11A:
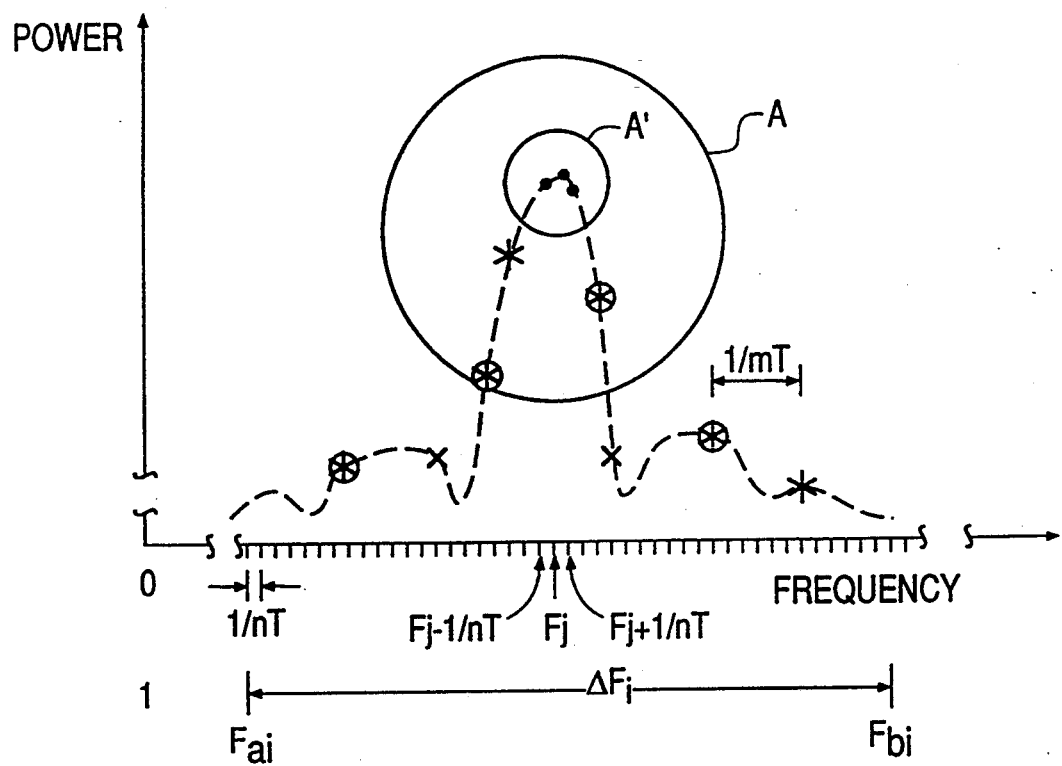
FIG. 11a shows the difference signal after zero padding, Fourier transformation and amplitude squaring.

FIG. 11a shows the plot of amplitude versus frequency after performing the FFT of step 204 and the magnitude squaring of step 205. In general, for an observation time T, zero-padding by a factor of m increases the resolution from $1/T$ to $1/mT$. The asterisks "*" with no circles correspond to $i^{th}$ Fourier transformed difference data absent zero-padding. The asterisks with circles together with the asterisks without circles represent the Fourier transformed zero-padded data resulting from step 204. Here, the resolution of the spectrum was doubled because the number of zeros added to the difference data was chosen to be $N_s$ (the number of sample points). This guarantees that 4 FFT points lie on the main lobe of the Fourier transformed difference signal and therefore that there will always be 3 points on the main lobe which can be used in quadratic interpolation step 208. Since the time available for sampling the $i^{th}$ difference signal is approximately T=1 ms and the $i^{th}$ difference signal is sampled for the entire time it is available to be sampled (approximately T as discussed above), the FFT output at step 204 has a resolution of $\frac{1}{2}T=500$ Hz, that is, the peak frequency of the difference signal $F_{Di}$ can be determined to within 500 Hz. However, the signal-to-noise density ratio of the target and reference IF signals (Equations 7b and 8b, respectively) as well as estimation error Equations 7a, 8a and 9 indicate that the difference frequency $F_{Di}$ can be determined to much higher accuracies (e.g.<1 Hz). Therefore, after the magnitude squaring step 205 is performed, quadratic interpolation step 206 is used to obtain a coarse estimate of difference frequency $F_{Di}$.

Figure 11B:
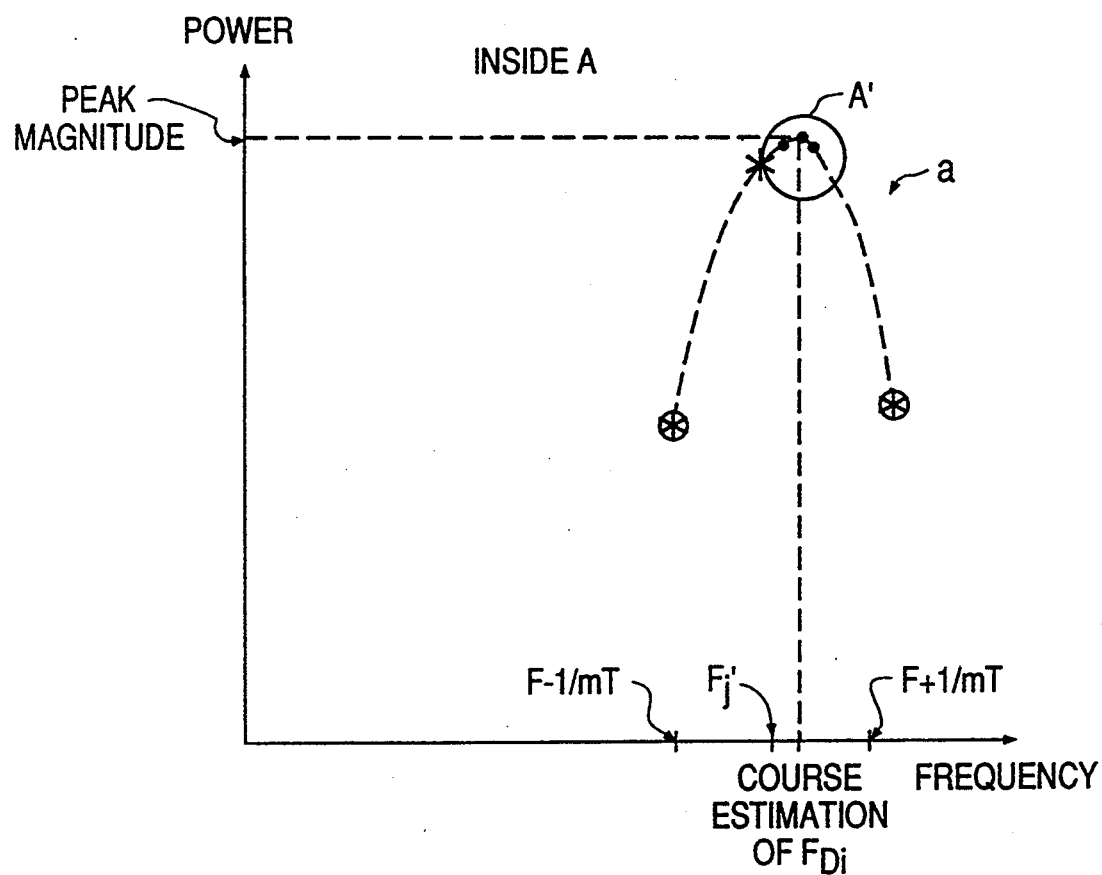
FIGS. 11b and 11c show the peak of the difference signal after performing a quadratic fit corresponding to steps 206 and 224, respectively, of FIG. 10.

Once searcher 150 has output the coarse estimation of the difference frequency $F_{Di}$, it goes into the tracking mode as shown in FIG. 10. The first time through steps 220–224 (the tracking mode) tracker 160 uses the same set of $i^{th}$ difference data used in the searching mode together with the coarse estimate of difference frequency $F_{Di}$ to determine a fine estimate of difference frequency $F_{Di}$. In particular, at step 222, the coarse estimation of the difference frequency $F_{Di}$ from searcher 150 (step 210) is used together with the initial set of $i^{th}$ digitized difference data obtained at step 220 to calculate three discrete Fourier transform (DFT) points. FIG. 11b shows inside circle A of FIG. 11a containing the 3 squared zero-padded windowed FFT difference data. Quadratic interpolation step 208 involves calculating the location of the peak of the hypothetical quadratic "a". The coarse estimation of the difference frequency $F_{Di}$ is the frequency which corresponds to this location. Steps 223 and 224 are similar to steps 205 and 208, respectively, but uses the three DFT points in circle A' (see FIG. 11c) rather than the three points in circle A (see FIG. 11b). The bandwidth $\Delta F_i$ corresponding to a full stroke $L_i$ is divided into J frequency bins of width 1/(nT) where n and J are integers and $J/(nT) = \Delta F_i$. The coarse estimate of the difference frequency $F_{Di}$ is used to determine which of all J possible frequencies is closest to the coarse estimate of the difference frequency $F_{Di}$. Since the frequency locations Fj are fixed, two weighing vectors Sj and Cj of dimension Ns (number of sample points) for each location Fj can be determined in advance and permanently stored in processor 140. Processor 140 can store the weighing vectors Sj and Cj corresponding to all J frequency locations Fj i=1 ... J in advance. Then calculations of the 3 DFT points (step 222) only involves six dot products of each of the vectors (Sj-1, Cj-1) (Sj, Cj) and (Sj+i, Cj+i) with data Ai output from step 220. Once the fine estimate of difference frequency $F_{Di}$ and the corresponding amplitude is obtained, built in test step 225 is used to determine the quality of the estimate of $F_{Di}$. The last good estimate of $F_{Di}$ is output to flight controller 8, steps 220–225 are repeated, but with tracker 160 receiving a new set of $i^{th}$ digitized difference data.

Figure 11C:
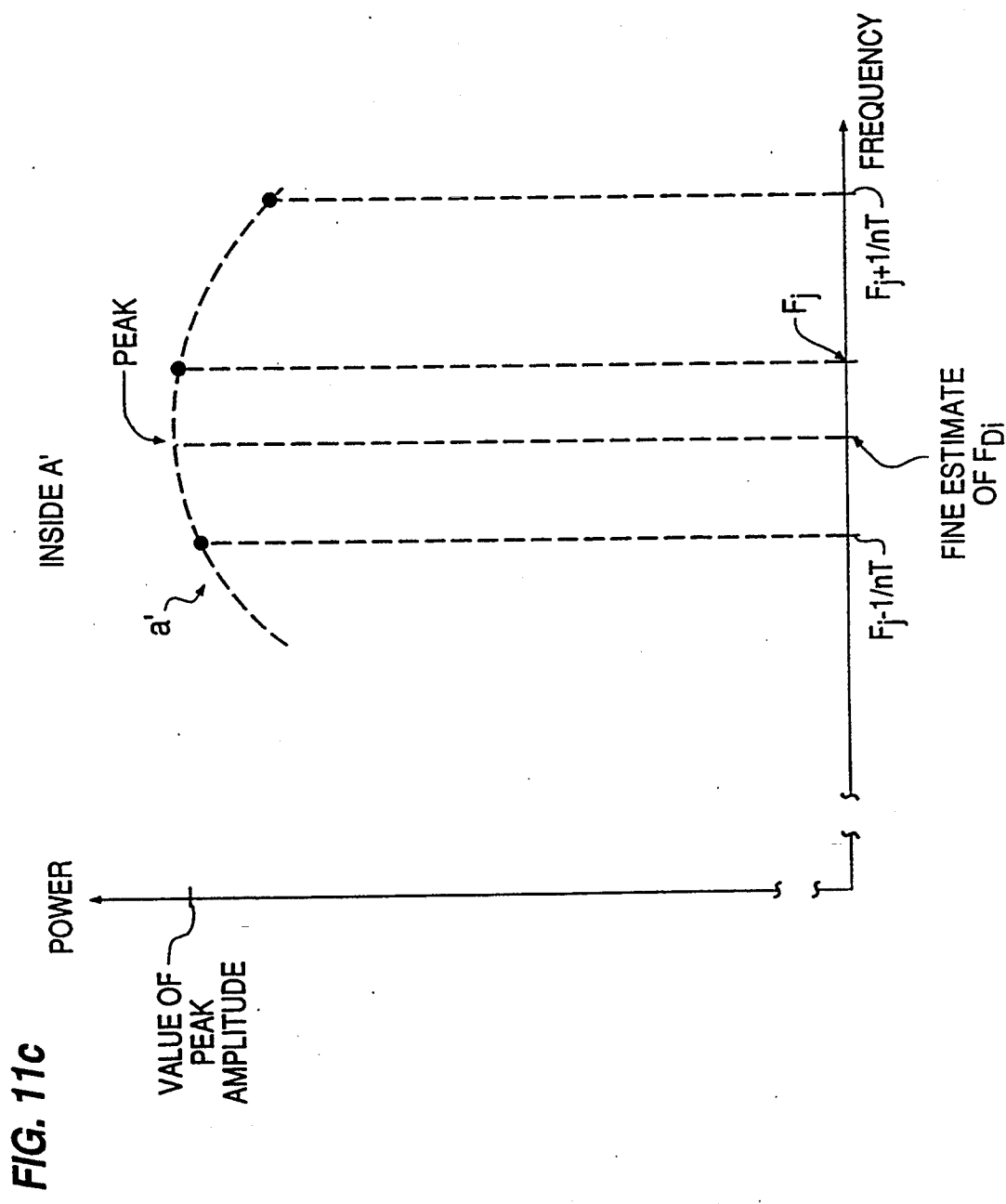

The 3 points in circle A' in FIG. 11a are shown as large dots in FIG. 11c. The curve a' formed by dashed lines represents a hypothetical quadratic function defined by the three points in circle A'. Quadratic interpolation step 208 involves calculating (estimating) the location of the peak of the hypothetical quadratic a'. If the frequency spacing from padding step 202 is 1/10 T=100 Hz (i.e., n=10) and a Tukey window is used, then quadratic interpolation step 208 results in a worst case difference frequency estimation error for $F_{Di}$ of less than 1 Hz for tones greater than or equal to 20 Khz. For B=6 Ghz this corresponds to a worst case position error of 1/40 mm=25 micrometers. Finally, if the stroke length Li=50 cm, then bandwidth $\Delta F_i=20$ Khz and the total number J of frequency bins Fj is 200.

Step 225 includes checking the quality of the estimation of the difference frequency. This can be done by using the value of the amplitude of the quadratic interpolation estimate of $F_{Di}$. If the amplitude changes by more than a predetermined amount, for example, 10% of the amplitude of the last good estimate of $F_{Di}$, then the measurement may be invalid. In such a case, the previous estimate of $F_{Di}$ is used in step 222 rather than the current estimate.

Tracker 160 repeats steps 220–225 at rates corresponding to position update rate $R'_i$. In addition, step 222 of tracker 160 can be performed in a much shorter time than step 204 of searcher 150 because step 204 requires approximately $pN_s$ $\log_2$ $pN_s$ calculations, whereas step 222 requires approximately $6N_s$ calculations where $N_s$ is the number of sample points and p is an integer corresponding to the number of sets of $N_s$ zeros which are added to the original Ns sample points. This enables digital processor 140 to output frequency $F_{Di}$ with high accuracies ($\delta F_i$ of less than 1 Hz) over a bandwidth $\Delta F_i$ of 20 Khz corresponding to stroke length Li of 50 cm with lag time $T_{Li}$ less than 0.5 ms. Lag time $T_{Li}$ can be reduced to nearly zero by performing dot products on the incoming data as it is being collected.

Figure 12A:
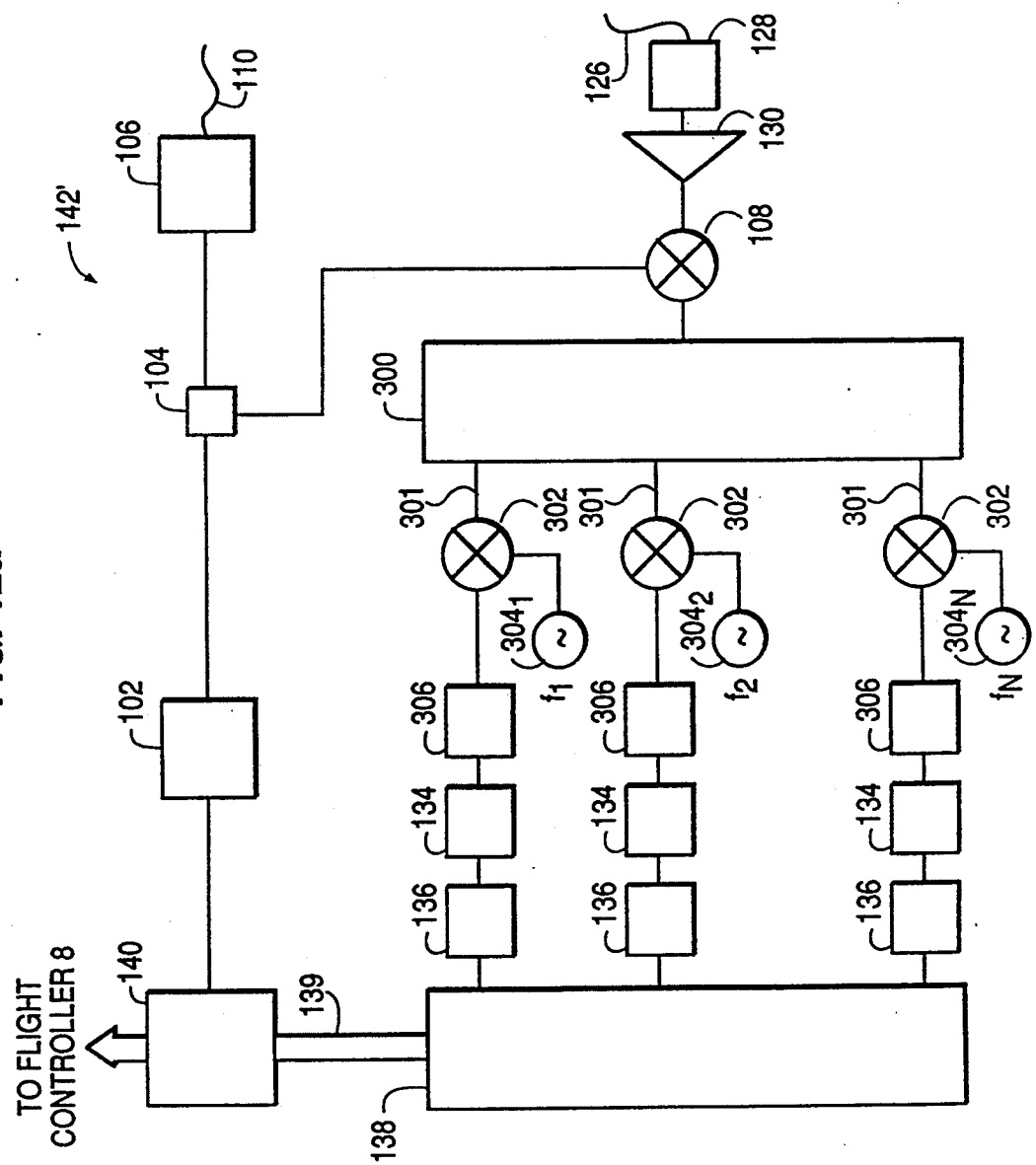
FIGS. 12a and 12b are block circuit diagrams of other embodiments of an optical position sensing system employing principles according to the invention.

FIG. 12a is a schematic diagram of a second embodiment of the invention with an active electronics unit 142' corresponding to active electronics unit 142 in FIG. 3. Like elements in FIGS. 3 and 12a have corresponding reference numerals. In this second embodiment, RF mixer 108 outputs the N IF target signals and N IF reference signals to an N-way RF power splitter 300 which has N RF outputs 301. Each of N RF outputs 301 has all 2N IF signals but at reduced power levels.

The 2N RF outputs 301 are input to N mixers 302, each of which is mixed with a mixing frequency fi from signal generators $304_i$ where i=1, ..., N. The frequencies fi of each of signal generators $304_i$ are chosen so that RF mixers 302 output N frequency shifted target IF signals and N frequency shifted reference IF signals with frequencies $F_{Ti}$ and $F_{Ri}$, respectively. Filters $306_{i-N}$ receive the N frequency shifted target IF signals and N frequency shifted reference IF signals. Each mixing frequency fi output by signal generator $304_i$ is chosen so that the corresponding $i^{th}$ frequency $F_{Ti}$ of $i^{th}$ frequency shifted target IF signal and frequency $F_{Ri}$ of $i^{th}$ frequency shifted reference IF signal is passed by the $i^{th}$ filter 306.

N non-linear devices 134 receive and square the filtered N frequency shifted target and N frequency shifted reference IF signals and each non-linear device 134 outputs a sum and difference signal with frequencies $F_{Si}$ and $F_{Di}$, respectively, for each of N position sensor heads 116. Finally, audio low pass filters 136 pass only the difference signals with peak frequencies $F_{Di}$ to A/D converter 138, and digital processor 140 searches and tracks successive peak frequencies $F_{Di}$ as discussed above.

Figure 12B:
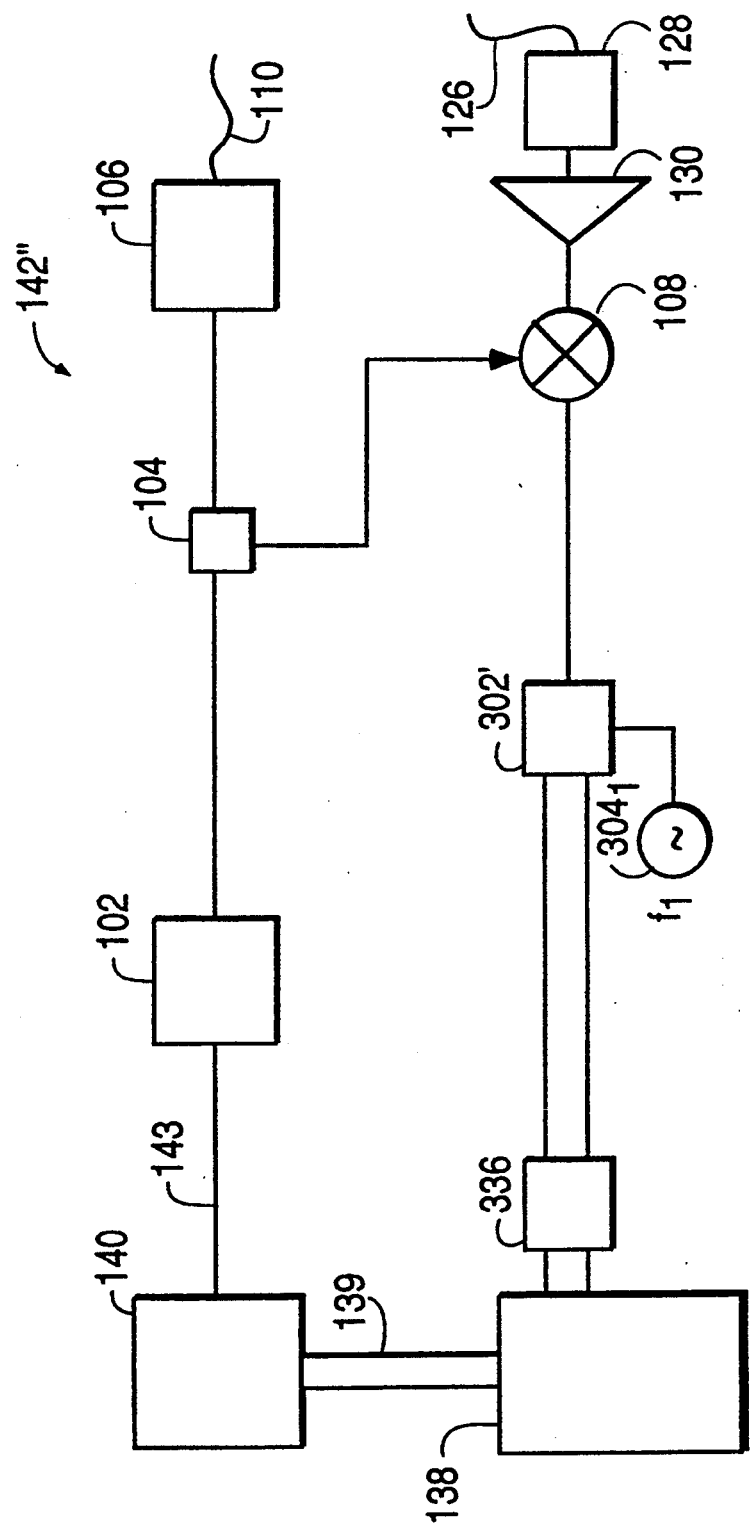
Figure 13A:
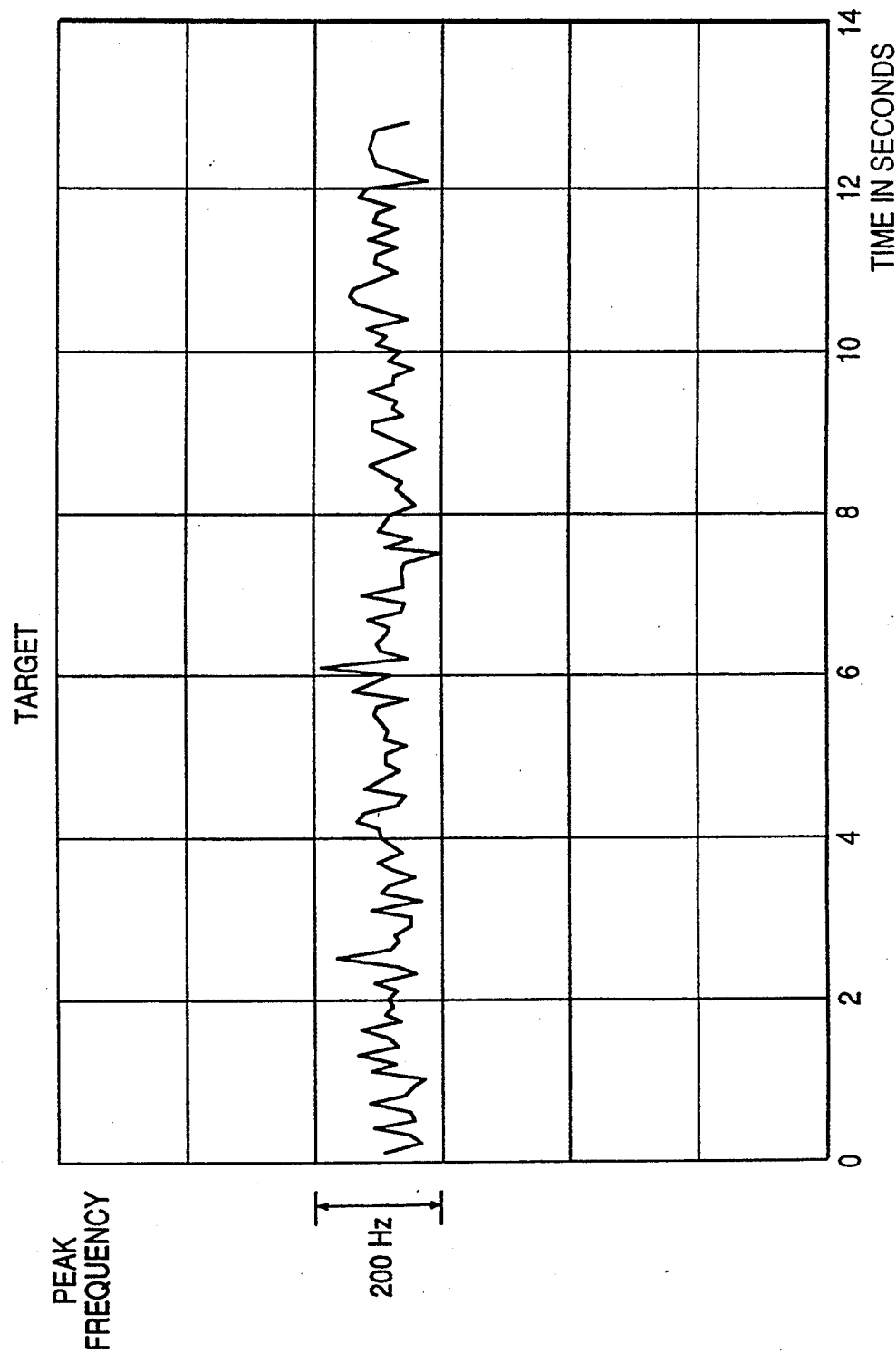
FIGS. 13a–13c show a series of actual output data for a fiber optic position sensor system according to the invention.
Figure 13B:
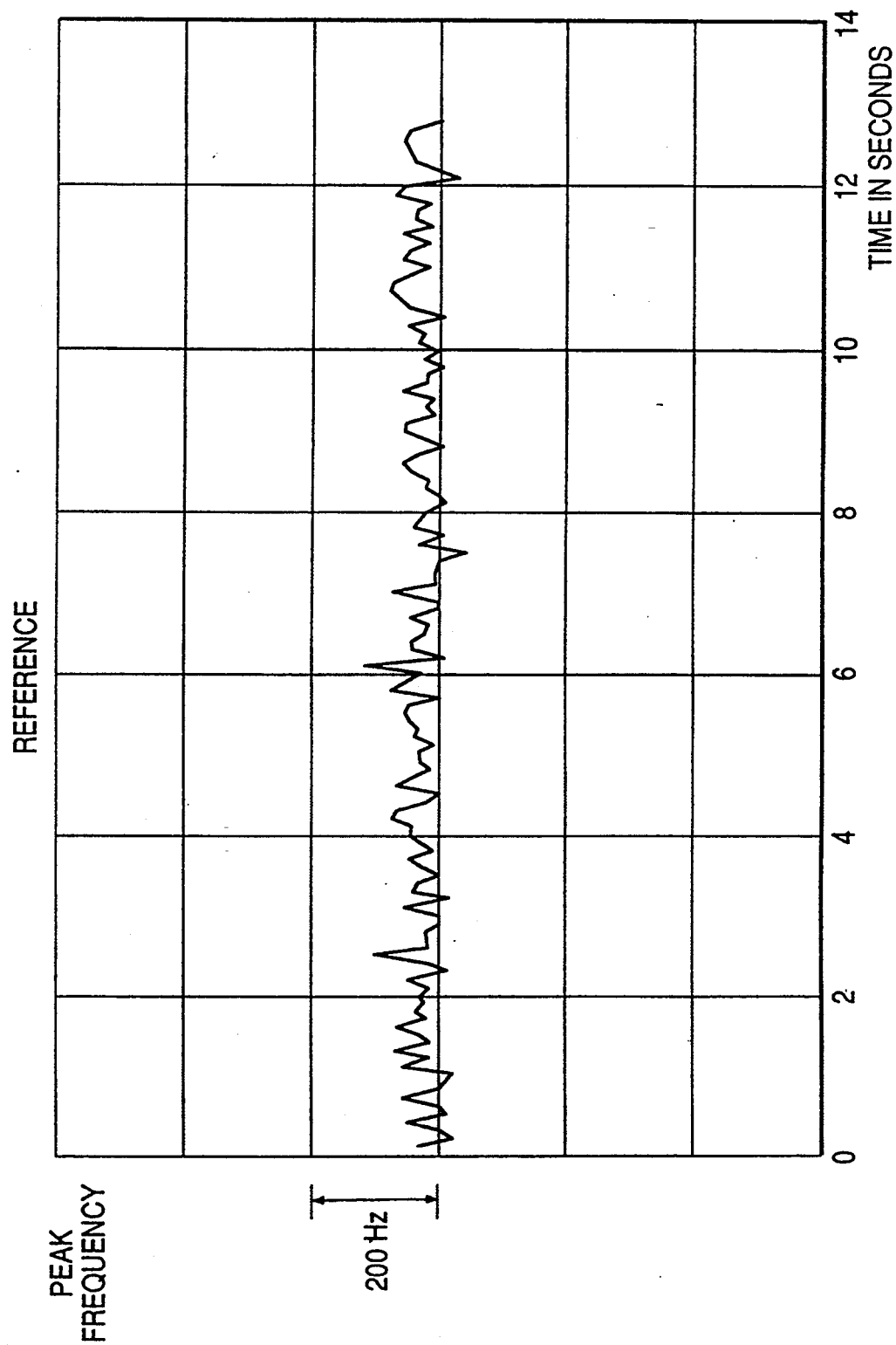
Figure 13C:
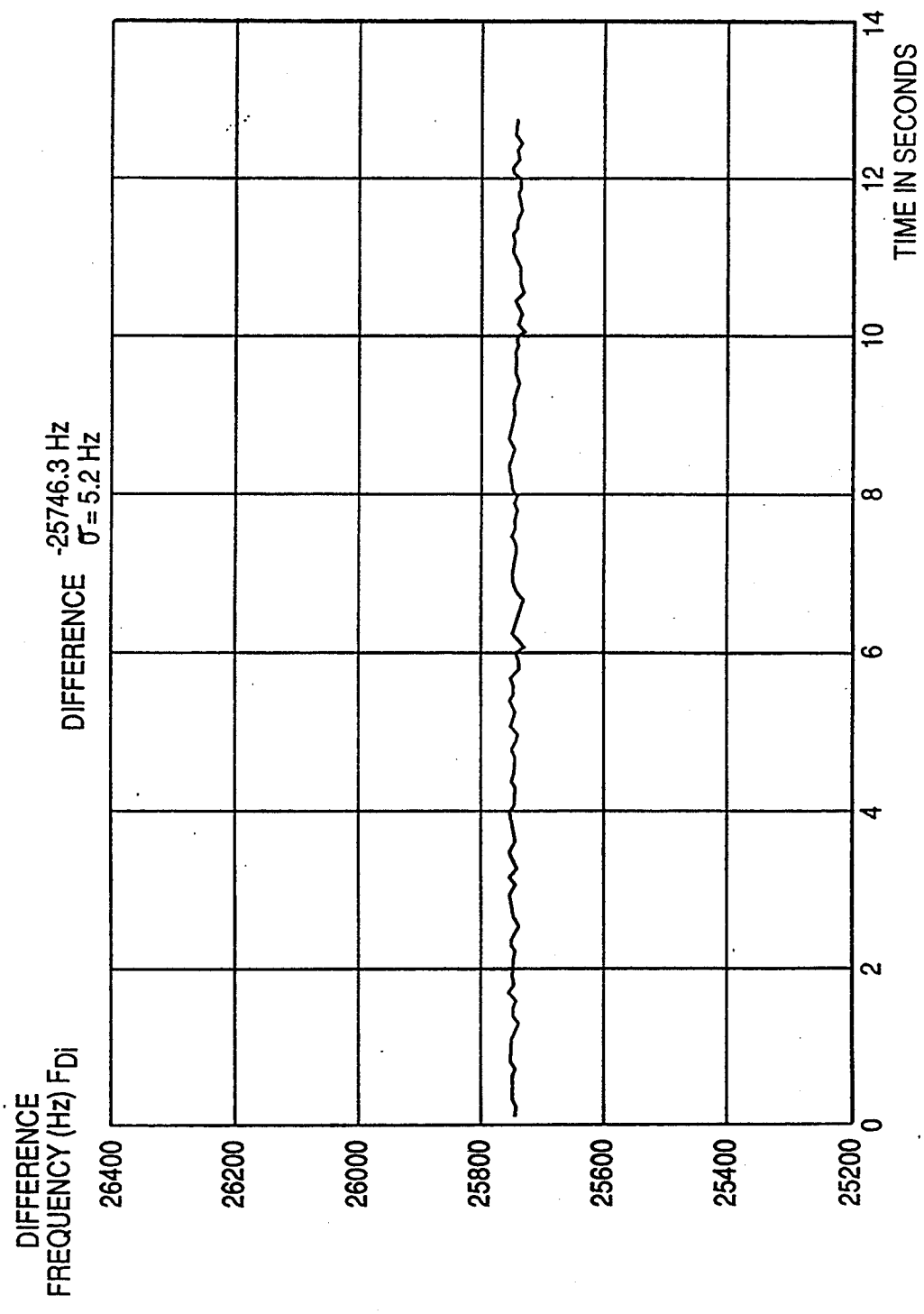

FIG. 12b shows an actual setup of a fiber optic position sensing system employing principles of the invention, at a fixed temperature and no vibrations using a chirped bandwidth of B=6 GHZ, chirp duration T=1 ms and update rate $R'_1=10$ Hz. Here, however, an IQ demodulator 302' or quadrature mixer RR-48 by KDI/Triangle Electronics was used. IQ demodulator 302' has two outputs, one corresponds to the signal output by mixers 302 in FIG. 12a and the other corresponds to that same signal shifted in phase by 90 degrees. These signals are filtered by IQ filters 336 and sampled by A/D converter 138. One linear position sensor head 116 was used along with active electronics unit 142'' without non-linear devices 134. FIGS. 13a–13c show a series of actual output data for a fiber optic position sensing system of FIG. 12b. In this case, since the peak frequencies $F_{T1}$ and $F_{R1}$ were fairly well defined, it was possible to simply subtract the peak frequency $F_{T1}$ from the peak frequency $F_{R1}$ to obtain difference frequency $F_{D1}$.

FIG. 13a shows a series of 130 actually measured peak target frequencies $F_{T1}$. An average target IF peak frequency, $aveF'_{T1}$ was measured with an RMS error of $\delta F_{T1}=28.8$ Hz, which corresponds to a target measurement error (position measurement accuracy) $\delta L_{T1}$ of 0.72 mm.

FIG. 13b shows a corresponding frequency versus time graph of 130 actually measured peak reference frequencies $F_{R1}$. An average reference IF peak frequency, $aveF'_{R1}$ IF was measured with an RMS error of $\delta F_{R1}=28.0$ Hz which corresponds to a measured—reference position error (position measurement accuracy) $\delta L_{R1}$ of 0.7 mm.

FIG. 13c shows the resulting difference frequencies $F_{Di}$. Here the difference frequency $F_{D1}$ is $F_{T1}-F_{R1}$, which yields an average difference frequency $aveF_{D1}$ of 25,746.3 Hz. The average difference frequency, $aveF_{D1}=25,746.3$ Hz had an RMS error (position measurement accuracy) $\delta F_{D1}$ of 5.2 Hz which corresponds to a relative target position error of $\delta L_{S1}=0.13$ mm.

According to equation 9, if the target error and reference error are independent of each other, the expected error $\delta L_{S1}$ should be $$\delta L_{S1}=[(0.7)^2+(0.72)^2]^{\frac{1}{2}}=1.0 \text{ mm}.$$

However, since the target position error $\delta L_{Si}$ was measured to be 0.13 mm, errors in the target position and reference position are not independent of each other, and consequently contributions to errors $\delta F_{T1}$ and $\delta F_{R1}$ due to non-repeatability in the RF chirps are significantly reduced.

Estimation of the actual difference frequency of the difference signal shown in FIG. 8 was achieved using active electronics unit 142 in FIG. 1, i.e., using non-linear devices 134. Here, with T=1 ms, B=6 Ghz, $R_i=250$ Hz, $T_{Li}=100$ microseconds and with the difference signal having approximately the same signal-to-noise density ratio as the previous example, an rms position error of 50 micrometers was achieved. Therefore, in addition to canceling non-repeatability of chirp slope from RF chirp source 102, errors due to nonlinearities in each individual chirp were also significantly reduced.

Figure 14:
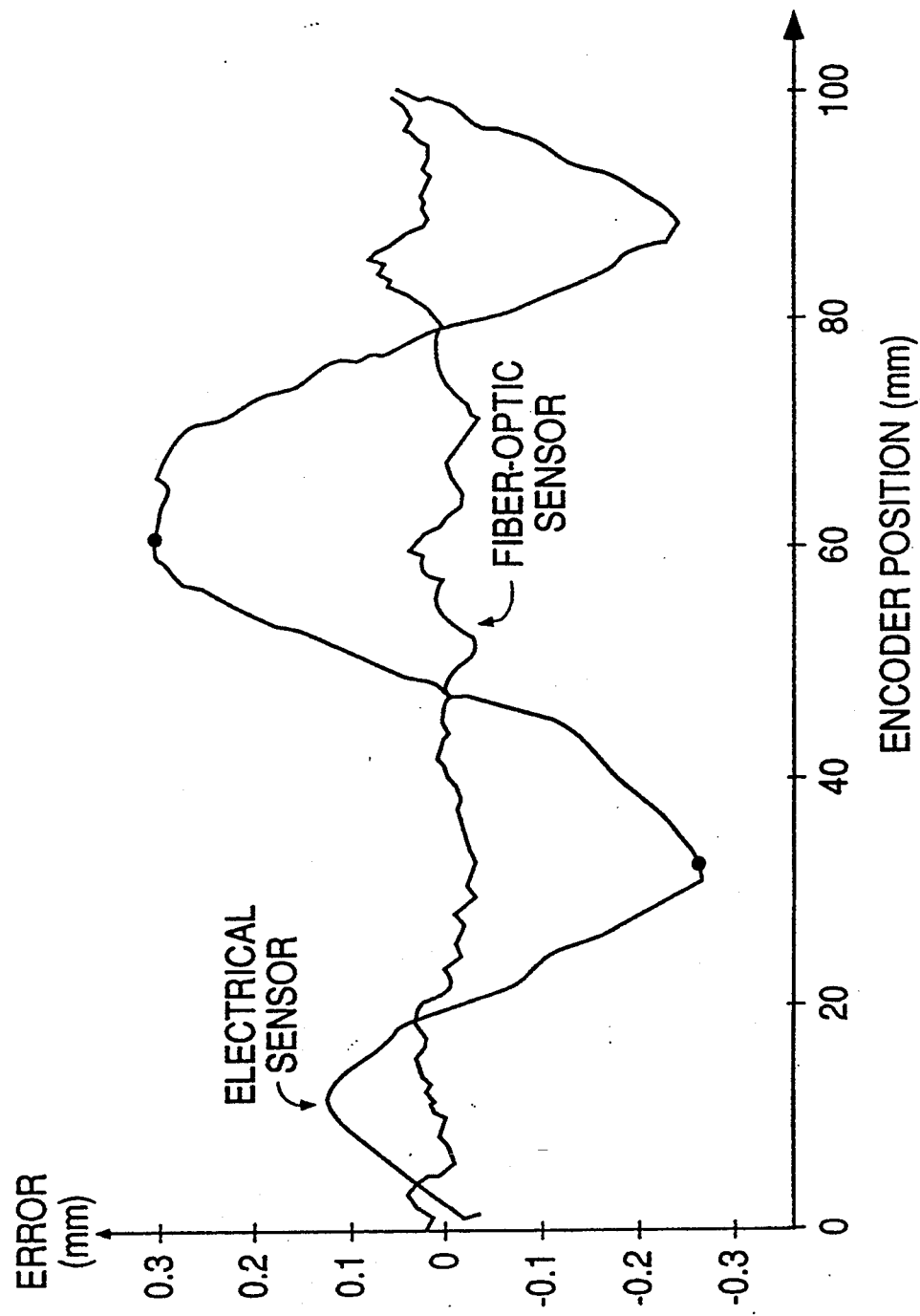
FIG. 14 shows a series of bias errors from a fiber optic position sensor system as compared to an electric sensor.

FIG. 14 shows a plot of bias errors in position measurements by a fiber optic position sensing system employing principles of the invention (including non-linear devices 134) compared to bias errors in position measurements by an electronic sensor. The target was moved 100 mm in known increments and its position measured while at rest. Here, the chirp bandwidth B=6 Ghz, chirp duration T=1 ms, update rate $R'_i=250$ Hz and a lag time $T_{Li}=100$ microseconds. The RMS error of the fiber optic position sensing system with one sensor head 116 was measured to be 25 micrometers. The RMS error for the fiber optic position sensing system was measured to be 45 micrometers when optical losses resulting from N=6 sensor heads 116 were introduced.

Figure 15:
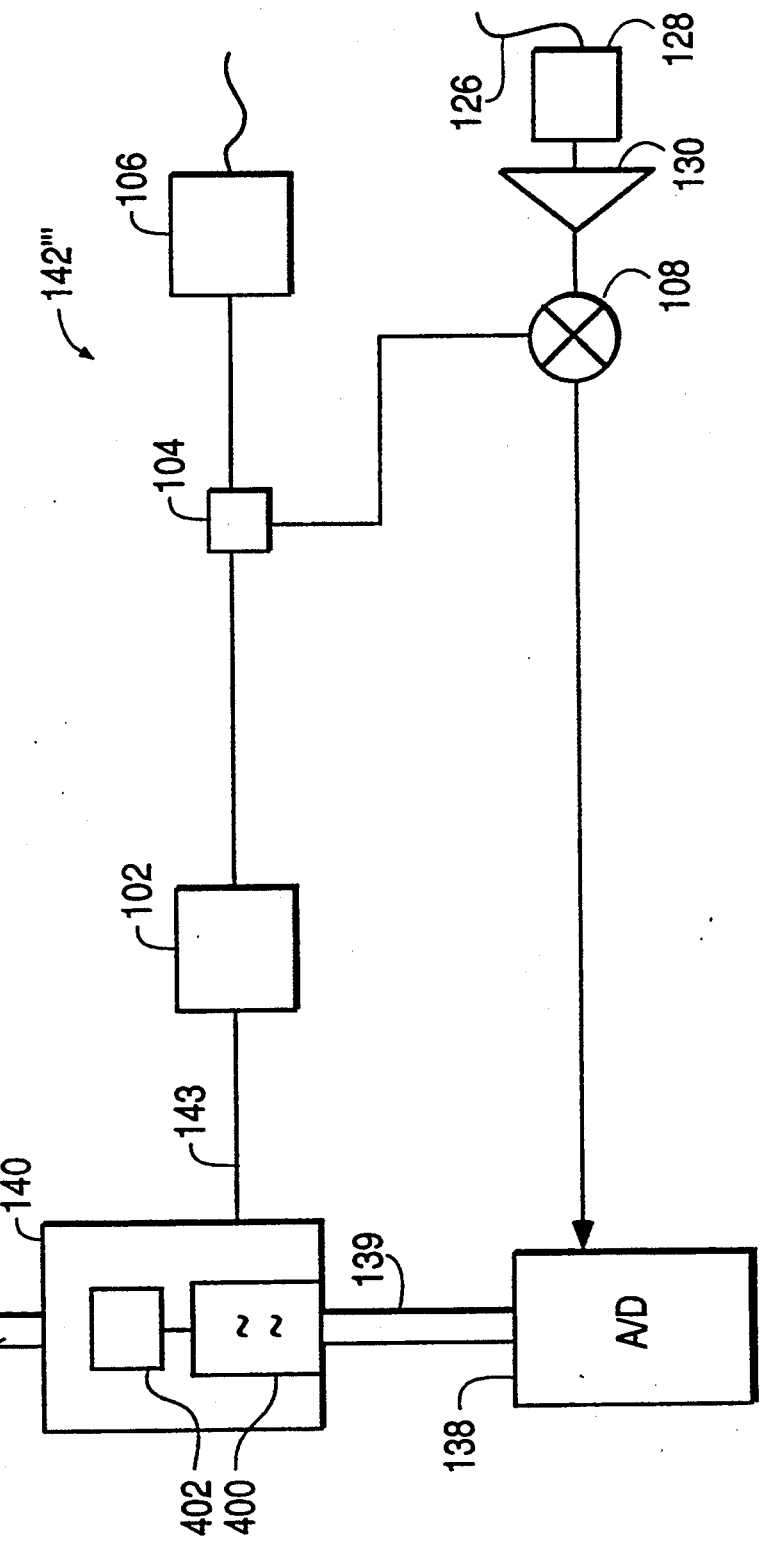
FIG. 15 is a block circuit diagram of another embodiment of the invention utilizing digital filtering and squaring.

As was mentioned above, the squaring accomplished by non-linear devices 134 can be done digitally. FIG. 15 is a block circuit diagram of an embodiment of active electronics unit 142''' with a digital filter 400 and a digital squaring unit 402. Digital filter 400 and digital squaring unit 402 can be implemented using specifically designated hardware or using software with digital processor 140. The sampled data from A/D converter 138 are input to filter 400 and filtered and then input to digital squaring unit 402 and squared. Then the difference signal of the squared digital data from digital squaring unit 402 is input to searcher 150 to acquire a coarse estimate of difference frequency $F_{Di}$ and then to tracker 160 for a fine estimate of the difference frequency $F_{Di}$. Hence, searcher 150 and tracker 160 operate in the same manner as described above.

In the discussion that follows, it is shown how fiber optic sensing system 100 can support rotation sensor heads 116'. Identical reference numerals will be used for those elements which are the same.

Figure 16:
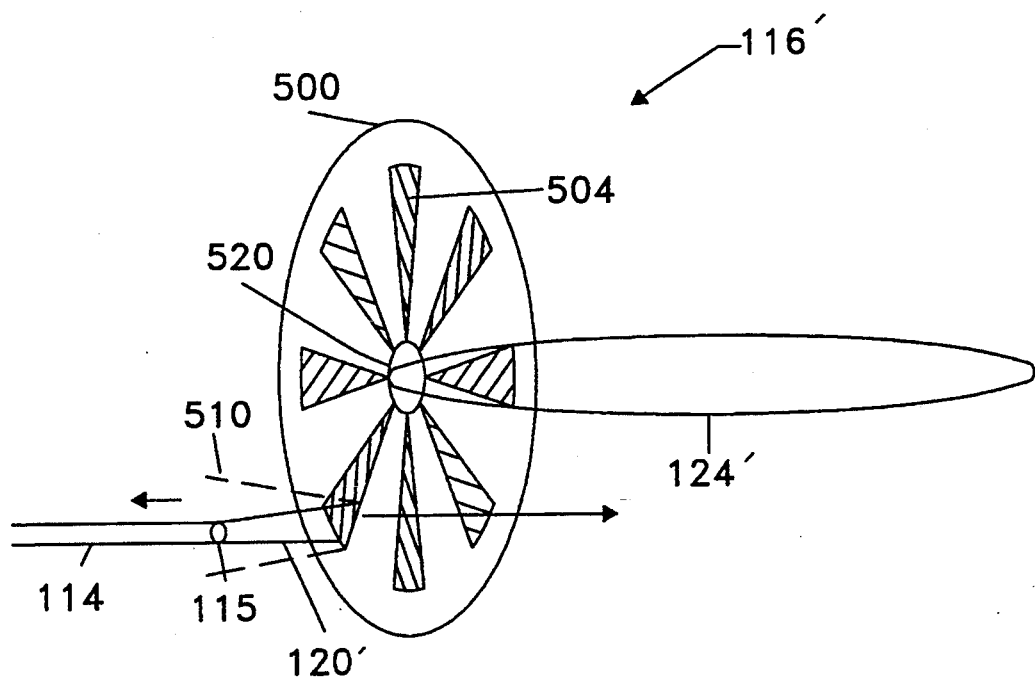
FIG. 16 shows one embodiment of a rotary sensor head 116' which can be connected to optical sensing system 100 in an identical manner as position sensor heads 116 shown in FIG. 3.

FIG. 16 shows one embodiment of a rotation sensor head 116' which can be connected to optical sensing system 100 in an identical manner as position sensor heads 116 (see FIG. 3). Again, one of the N chirped IM optical signals is output by second transmitting fiber 114. Beam 120' need not be collimated (unlike beam 120 of position sensor head 116 in FIG. 4), because no corner cube or reference signal is required. Beam 120' travels toward a disk 500 which is secured to a rod 124' whose rotation rate is to be measured. Rod 124' can be connected, for example, to a rotor on an aircraft. Also, fiber tip 115 can be positioned very close to disk 500 so that the diameter of beam 120' remains small, thereby keeping rotation sensor head 116' small.

Disk 500 has reflecting sections 504 in the shape of wedges. Disk 500 can be made of a metal or plastic and sections 504 can be aluminum or other reflective material. Beam 120' is reflected into beam 510. A portion of beam 510 is then subtended by fiber tip 115 as a chirped IM rotation signal (similar to the chirped IM target signal for the position sensor). This occurs for each of the N chirped IM optical signals some (say M) returning from position sensor heads 116 (resulting in M chirped IM optical target signals) and others (say P) returning from rotation sensor heads 116' (resulting in P chirped IM rotation optical signals), wherein the total number of sensor heads is N=M+P.

Figure 17A:
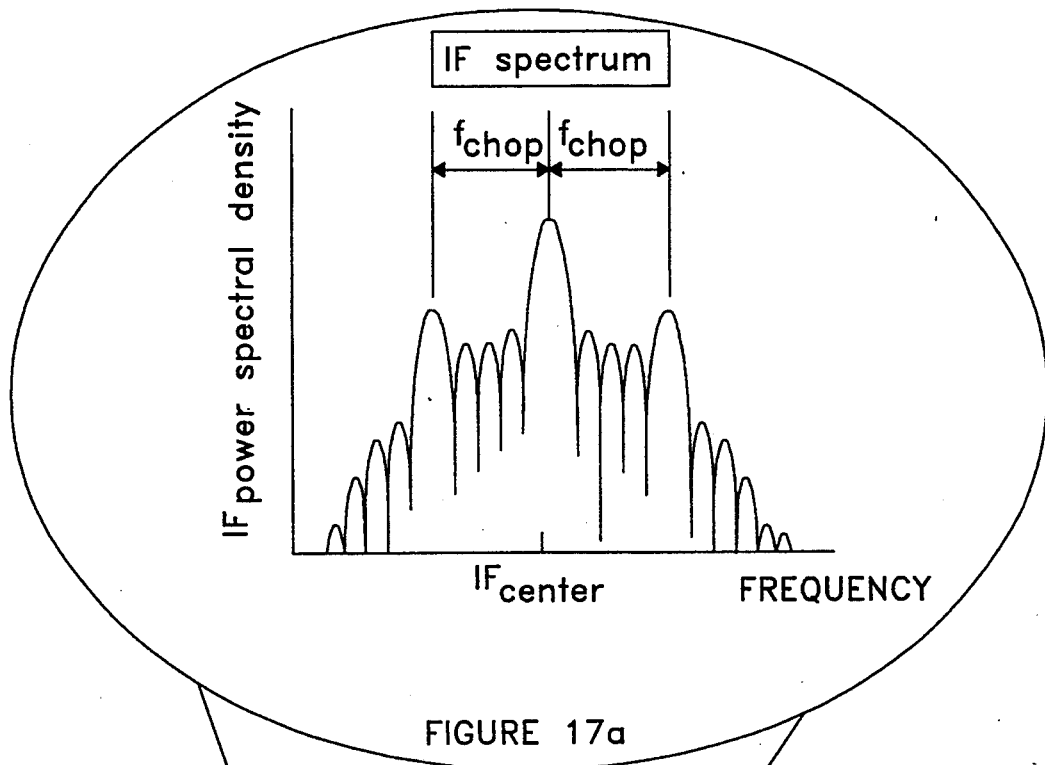
FIG. 17a and 17b show graphical representations of an RF mixing process at mixer 108 in FIG. 3.
Figure 17B:
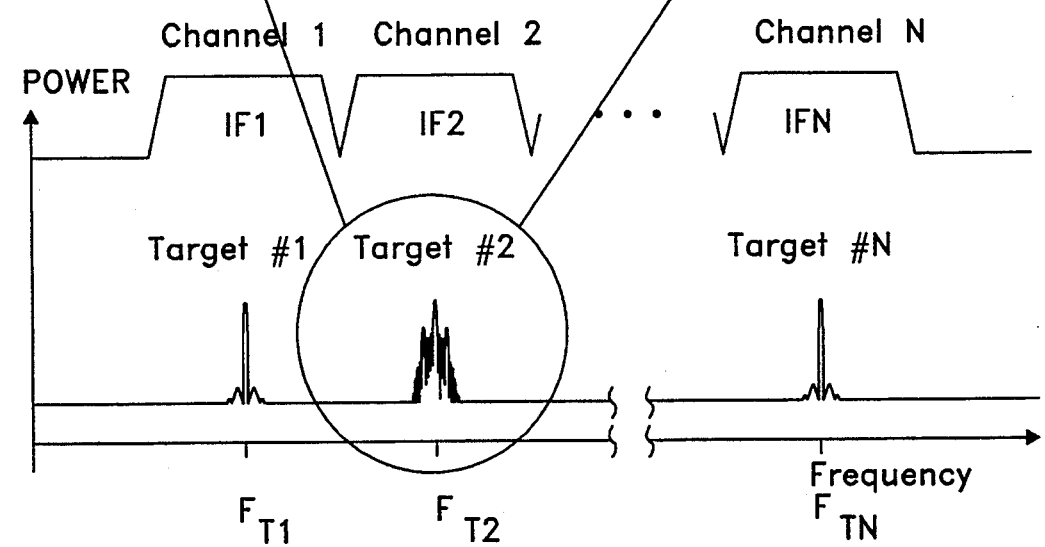

Referring to FIGS. 3 and 5a–5c, as was the case with position sensors 116, photodiode receiver 128 outputs N delayed chirped RF signals. These N delayed chirped RF signals are amplified by linear amplifier 130 which outputs N chirped amplified RF target signals to RF mixer 108. RF mixer 108 mixes the N chirped amplified RF signals with the chirped RF local oscillator signal from RF splitter 104 and outputs M IF position signals and P IF rotation signals. As an example, FIG. 17a and 17b shows IF position signals in channels 1 and N, and an IF rotation signal in channel 2. Just as the total delay $T_{Ti}$ frequency channel (see FIG. 5c) a particular IF signal would appear in the case of position sensor heads 116, here too, the amount of time required for the IM optical signals to reach the P rotation sensor heads 116' determines which frequency channels those IF rotation signals will appear. Consequently, as before, one need only vary the lengths of fibers 114 to cause the rotation signals to appear in a different channel. That is, the rotation sensor heads 116' can be multiplexed with position sensor heads 116.

The P chirped IM rotation optical signals from rotation sensor heads 116 once mixed with the RF local oscillator signal from splitter 104, output P IF rotation signals with IF center frequencies of $F_{Ti}$ and sidebands at frequencies $F_{Ti}\pm Fr_i$, where $Fr_i$ is a known multiple of the rotation rate $fr_i$ of disk 500. Once $Fr_i$ is determined, the rotation rate $fr_i$ of disk 500 is known. For example, if disk 500 has 4 reflective sections 504, then $fr_i=Fr_i/4$. Also, beam 120' can be transmitted directly to a surface 520 of rod 124'. In this case if surface 520 is not optically smooth and beam 120' is not focussed on the longitudinal axis of rod 124', then rod 124' modulates beam 120' directly to produce sidebands at frequencies $F_{Ti}\pm Fr_i$.

Disk 500 intensity modulates the chirped IM optical signals producing an infinite number of sidebands at frequencies $F_{Ti}\pm nFr_i$, where n is an integer, provided the width of sections 504 (at the point beam 120' intersects sections 504) is much larger than the diameter of beam 120' at the location. However, the higher order sidebands can be reduced or eliminated if the width of sections 504 (at the point where beam 120' intersects sections 504) is reduced to approximately the same size as the diameter of beam 120' at that point. Also, if the distance from the center of disk 500 to the optical axis of fiber 114 is reduced, the ratio of the width of sections 504 to the diameter of beam 120' is reduced, thereby reducing the amplitudes of the higher order sidebands.

The P IF rotation signals like the M IF target and reference signals pass through N channel filter 132 and then through N nonlinear devices 134. Just as these nonlinear devices canceled spectral distortions due to non-linear chirps produced by RF chirp source 102 with position sensor heads 116, here again such spectral distortions will be eliminated. Moreover, non-linear devices 134 again produce sum terms $F_{Si}$ and difference terms $F_{Di}$, wherein $Fr_i$ is one of the difference terms. The outputs of non-linear devices 134 are input to A/D converter 138 which synchronously samples and digitally multiplexes analog signals output by audio low pass filters 136. Digital processor 140 receives the digitized difference signals from A/D converter 138 and estimates the N difference frequencies $F_{Di}$. M of these difference frequencies relate to positions $L_{Si}$ of rods 124, and P of them relate to rotation rates $Fr_i$ of rods 124'.

Alternatively, nonlinear devices 134 can be bypassed and digital processor 140 can estimate both the center frequency $F_{Ti}$ as well as the sideband frequency of at least one of the two sidebands, say $F_{Ti}+Fr_i$, and then subtract these estimates to obtain Fri or digitally squaring LPF and DFT to find Fri. However, this approach can result in a performance penalty due to non-linearities in frequency versus time of any one chirp output by chirp source 102 as discussed above.

Figure 18:
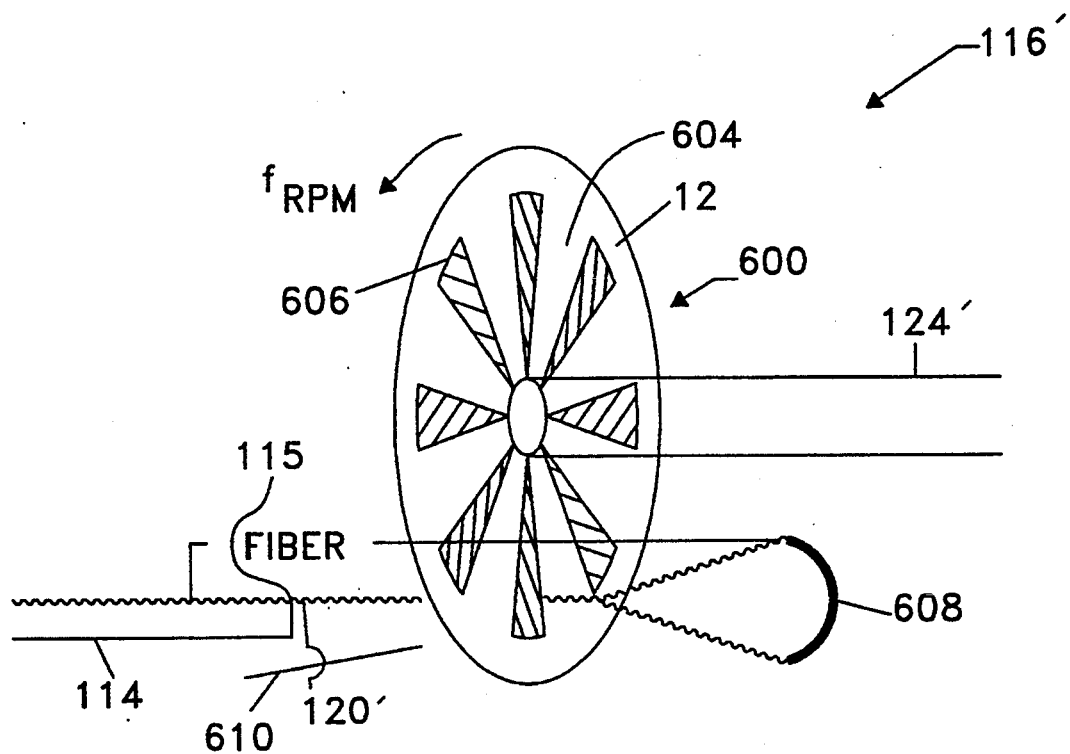
FIG. 18 shows an alternative embodiment of rotation sensor head 116'.

FIG. 18 shows an alternative embodiment of rotation sensor head 116'. Again, one of the N chirped IM optical signals is output by second transmitting fiber 114. Beam 120' need not be collimated, because no corner cube or reference signal is required. Beam 120' travels toward a disk 600 which is secured to a rod 124' whose rotation rate is to be measured. Disk 600 has transmissive sections 604 and opaque sections 606. Transmissive sections 604 transmit beam 120' to a reflecting surface 608. Opaque sections 606 block beam 120' from reaching reflecting surface 608. Disk 600 can be made of a metal or plastic and sections 606 can be made of an absorptive material. Beam 120' is reflected by reflecting surface 608 into beam 610 and a portion of beam 610 is then subtended by fiber tip 115 as a chirped IM rotation signal. Reflecting surface 608 can be curved to focus beam 120' in the general region of fiber tip 115. (It may not be advantageous to tightly focus beam 120' onto fiber tip 115, since a small shift in the relative orientation of fiber 114 could cause beam 610 to miss fiber tip 115.)

Figure 19:
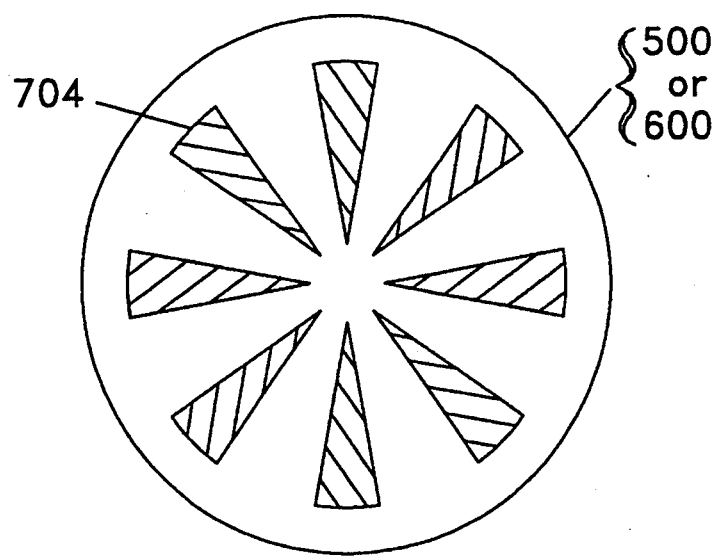
FIG. 19 shows another embodiment of the rotation sensor head having reflective or transmissive wedges which are sinusoidal functions of the rotation position of disks 500 and 600, respectively.

Sections 504 or 604 are not limited to on/off shapes as shown in FIG. 16. FIG. 19, for example, shows another embodiment of disks 500 or 600 which has wedges 704. Wedges 704 can be reflective or transmissive and their respective reflectivity and transmissivity are sinusoidal functions of the rotation of disks 500 or 600, respectively. The advantage of wedges 704 is that even if the diameter of beam 120' is much smaller than the widths of respective segments 704, the resulting modulation of the chirped IM optical signals yields only two sidebands.

What is claimed is:

1. An optical sensing system for sensing the rotation rate of a rotatable object, comprising:
   electro-optical means for outputting a modulated optical signal and a chirped rf signal, the envelope of the modulated optical signal having a phase that has a known relation to the phase of the chirped rf signal;
   light guide means coupled to said electro-optical means for receiving and transmitting the modulated optical signal along an optical path for reflection off a surface associated with said rotatable object to provide a rotation sensing optical signal;
   transducing means, having an output and two inputs, coupled to the rotatable object, one of the two inputs being electrically coupled to said electro-optical means for receiving the chirped rf signal and the other of the two inputs being optically coupled to said light guide means for receiving the rotation sensing optical signal having a first time delay with respect to the chirped rf signal, said transducing means producing at its output a multi-frequency electrical signal which includes a first frequency corresponding to the first time delay and at least one sideband frequency associated with the rotation rate of the rotatable object; and
   rotation detecting means coupled to the output of said transducing means for processing the multi-frequency signal and determining a difference frequency corresponding to the difference between the first frequency and the sideband frequency and representing the rotation rate of the rotatable object.

2. The optical sensing system as claimed in claim 1, further comprising:
   an optical signal directing means for directing the optical signal in a first direction,
   a disk positioned in said first direction and coupled to the rotatable object so that it rotates in accordance with the rotation of the rotatable object, said disk having at least one section serving as said surface associated with the rotatable object, for intercepting the chirped optical signal in accordance with the rotation of the rotatable object, thereby producing a modulated optical signal; and
   optical transmitting means for transmitting the modulated optical signal away from said disk.

3. The optical sensing system as claimed in claim 1, wherein said electro-optical means comprises;
   rf source means for producing the chirped rf signal; and
   controllable light source means having a modulating input coupled to the chirped rf signal for producing the modulated optical signal.

4. The optical sensing system as claimed in claim 2, wherein said at least one section is wedge shaped.

5. The optical sensing system as claimed in claim 2, wherein said disk has alternating reflective wedges and non-reflective wedges.

6. The optical sensing system as claimed in claim 2, wherein said optical signal directing means comprises optical fiber.

7. The optical sensing system as claimed in claim 2, wherein said disk has a sinusoidally varying reflectivity.

8. The optical sensing system as claimed in claim 1, further comprising:
   optical signal directing means for directing the rotation sensing optical signal in a first direction;
   a disk positioned in said first direction and coupled to the rotatable object so that it rotates in accordance with the rotation of the rotatable object, said disk having at least one transmissive section which transmits portions of the chirped optical signal in accordance with the rotation of the rotatable object, thereby outputting a modulated optical signal;

reflecting means arranged up stream from said disk in said first direction for reflecting the modulated optical signal back to said optical signal directing means, whereby said reflecting means serves as the surface associated with the rotatable object; and optical transmitting means for transmitting the modulated optical signal away from said disk.

9. The optical sensing system as claimed in claim 8, wherein said disk has alternating reflective sections and non-reflective sections.

10. The optical sensing system as claimed in claim 1, wherein said light guide means comprises multimode fiber.

11. The optical sensing system as claimed in claim 8, wherein said rf source means comprises:

means for creating a digital signal representing the chirped rf signal; and digital-to-analog converter means, connected to said controllable light source means, for converting said digital signal into said chirped rf signal.

12. The optical sensing system as claimed in claim 1, wherein said light guide means comprises single mode fiber.

13. The optical sensing system as claimed in claim 11, wherein said rotation detecting means further includes processing means connected to said analogue-to-digital converter for digitally squaring the multi-frequency signal to produce a squared signal including a difference signal having a peak region in the frequency domain containing the difference frequency.

14. The optical sensing system as claimed in claim 1, wherein the rotatable object has a given range of rotations, and said rotation detecting means detects an initial difference frequency by searching for the difference frequency over a range of frequencies corresponding to the rotatable object.

15. The optical sensing system as claimed in claim 1, wherein said rotation detecting means includes means for receiving the initial difference frequency and means for tracking the difference frequency as the difference frequency changes corresponding to variations in the rotation rate of the rotatable object.

16. The optical sensing system as claimed in claim 1, further comprising shielding means for shielding said electro-optical means, said transducing means, and said rotation detecting means from electromagnetic interference and electromagnetic pulses.

17. The optical sensing system as claimed in claim 1, wherein there are a plurality of rotatable objects, the respective rotation rates of which are to be sensed, and said light guide means includes:

a plurality of optical fibers receiving and transmitting the modulated optical signal along respective optical paths for reflection off respective surfaces associated with the plurality of rotatable objects to produce respective rotation sensing optical signals; and optical coupling means for coupling the respective rotation sensing optical signals to the other input of said transducing means;

wherein the multi-frequency electrical signal output by said transducing means includes pairs of first and second frequencies, and said rotation detecting means determines a plurality of difference frequencies from the multi-frequency output, each difference frequency corresponding to the difference between the first and second frequencies of a respective pair of first and second frequencies and each difference frequency representing the rotation rate of a respective one of the rotatable objects.

18. The optical sensing system as claimed in claim 17, wherein said light guide means further includes a single optical fiber connected to said electro-optical means for receiving and transmitting the modulated optical signal and said optical coupling means includes means for distributing the modulated optical signal from said single optical fiber to said plurality of optical fibers.

19. The optical sensing system as claimed in claim 1, wherein said rotation detecting means comprises non-linear means for squaring the multi-frequency signal and outputting a squared signal including a difference signal having a peak region in the frequency domain containing the difference frequency.

20. The optical sensing system as claimed in claim 1, wherein said rotation detecting means comprises:

signal generating means for generating an rf mixing signal; and mixing means having one input connected for receiving the rf mixing signal, a second input connected for receiving the multi-frequency signal and an output for producing a frequency shifted multi-frequency signal.

21. The optical sensing system as claimed in claim 20, wherein said rotation detecting means further comprises non-linear means having an input for receiving the frequency shifted multi-frequency signal and an output for producing a difference signal having the difference frequency.

22. The optical sensing system as claimed in claim 1, wherein said rotation detecting means comprises a searching and tracking means for acquiring and updating the difference frequency.

23. In an aircraft including a flight controller for controlling flight of the aircraft, the combination comprising:

electro-optical means for outputting a modulated optical signal and a chirped rf signal, the envelope of the modulated optical signal having a phase that has a known relation to the phase of the chirped rf signal;

light guide means optically coupled to said electro-optical means for receiving and transmitting the modulated optical signal along a plurality of optical paths;

a plurality of rotation sensor heads and position sensor heads, each rotation sensor head having a rotatable object and each position sensor head having a displaceable object, each rotatable object and displaceable object being disposed in one of said plurality of optical paths for altering the modulated optical signal to provide a rotation sensing optical signal and a position sensing optical signal, respectively, and each position sensor head further including reference reflecting means disposed in the optical path upstream of the corresponding displaceable object for partially reflecting the modulated optical signal to provide a reference optical signal; and position and rotation detecting means having an input optically coupled to said plurality of position sensor heads and rotation sensor heads for receiving the position sensing optical signals and the rotation sensing optical signals, respectively, said position and rotation detecting means having another input electrically coupled to said electro-optical means for receiving the chirped rf signal; and processing means for processing the position sensing optical signals, the rotation sensing optical signals, the reference optical signals and the chirped rf signal and outputting to the flight controller a plurality of signals associated with respective positions of the displaceable objects and rotation rates of the rotatable objects.

24. A fiber optic rotation sensing system comprising:

source means for producing a chirped rf signal;

rf splitter means coupled to said source means for receiving and splitting the chirped rf signal into a first chirped rf signal and a second chirped rf signal;

optical modulating means for receiving the first chirped rf signal and producing a modulated optical signal in accordance with the first chirped rf signal;

optical fiber means coupled to said optical modulating means for receiving and transmitting the modulated optical signal along an optical path;

reflector means fixed to a rotatable object and disposed in the optical path of the transmitted modulated optical signal for altering the transmitted modulated optical signal to provide a rotation optical signal in dependence of the rotation rate of the rotatable object;

optical coupling means having an output and an input for receiving the rotation optical signal at said input and coupling the rotation optical signal to the output of said optical coupling means;

transducing means optically coupled to the output of said optical coupling means for producing a rotation electrical signal;

mixing means having an output and an input coupled, respectively, to said rf splitter means and said transducing means for mixing the first chirped rf signal and the rotation electrical signal and for outputting a multi-frequency signal including first and second frequencies, respectively;

means for acquiring an initial difference frequency equal to the difference between the first and second frequencies and corresponding to the rate of rotation of said rotatable object; and means for tracking subsequent difference frequencies resulting from changes in the rate of rotation of the rotatable object.

25. A method for determining the rotation rate of a rotatable object, comprising:

producing a chirped rf signal;

producing a modulated optical signal having an envelope of modulation with a phase that is known with respect to the phase of the chirped rf signal;

transmitting the modulated optical signal along an optical path and altering the modulated optical signal with the rotatable object to provide a rotation sensing optical signal;

producing an electrical signal as a function of the rotation sensing optical signal;

mixing the chirped rf signal and the electrical signal to produce a multi-frequency signal with first and second frequencies; and detecting a difference frequency of the multi-frequency signal corresponding to the difference between the first and second frequencies, the difference frequency representing the rate of rotation of the rotatable object.

26. The method as claimed in claim 25, wherein said detecting step includes squaring the multi-frequency signal and outputting an analog difference frequency signal.

27. The method as claimed in claim 26, wherein said detecting step further includes converting the analog difference frequency signal to digital difference frequency data.

28. The method as claimed in claim 27, wherein the rotatable object has a range of rotation frequencies which corresponds to the rotatable object, and said detecting step further comprises searching over the range of difference frequencies for the difference frequency corresponding to a current rotation rate of the rotatable object.

29. The method as claimed in claim 28, wherein said detecting step further includes tracking the difference frequency as the rotation rate of the rotatable object varies.

* * * * *